(12) United States Patent
Chen et al.

(10) Patent No.: US 10,684,391 B2
(45) Date of Patent: Jun. 16, 2020

(54) SYSTEM AND METHODS FOR CROSS-SENSOR LINEARIZATION

(71) Applicant: HALLIBURTON ENERGY SERVICES, INC., Houston, TX (US)

(72) Inventors: Dingding Chen, Tomball, TX (US); Bin Dai, Spring, TX (US); Christopher M. Jones, Houston, TX (US); Darren Gascooke, Houston, TX (US); Tian He, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 16 days.

(21) Appl. No.: 15/900,679

(22) Filed: Feb. 20, 2018

(65) Prior Publication Data

US 2018/0180767 A1    Jun. 28, 2018

Related U.S. Application Data

(63) Continuation of application No. 14/783,522, filed as application No. PCT/US2014/072489 on Dec. 29, 2014, now abandoned.

(51) Int. Cl.
| | | |
|---|---|---|
| G06G 7/48 | (2006.01) |
| G01V 13/00 | (2006.01) |
| E21B 47/12 | (2012.01) |
| E21B 7/00 | (2006.01) |
| E21B 47/06 | (2012.01) |
| E21B 49/08 | (2006.01) |
| G01V 8/10 | (2006.01) |

(52) U.S. Cl.
CPC ............... *G01V 13/00* (2013.01); *E21B 7/00* (2013.01); *E21B 47/06* (2013.01); *E21B 47/065* (2013.01); *E21B 47/123* (2013.01); *E21B 49/08* (2013.01); *G01V 8/10* (2013.01)

(58) Field of Classification Search
CPC ........................................................ G01V 13/00
USPC ........................................................ 703/10, 20
See application file for complete search history.

(56) References Cited

U.S. PATENT DOCUMENTS

| | | |
|---|---|---|
| 6,799,117 B1 | 9/2004 | Proett et al. |
| 2004/0133531 A1 | 7/2004 | Chen et al. |
| 2007/0011115 A1 | 1/2007 | Smith et al. |

(Continued)

OTHER PUBLICATIONS

International Search Report and Written Opinion from PCT/US2014/072489 dated Sep. 1, 2015 9 pp.

*Primary Examiner* — Hugh M Jones
(74) *Attorney, Agent, or Firm* — Gilliam IP PLLC

(57) ABSTRACT

A method includes obtaining a plurality of master sensor responses with a master sensor in a set of training fluids and obtaining node sensor responses in the set of training fluids. A linear correlation between a compensated master data set and a node data set is then found for a set of training fluids and generating node sensor responses in a tool parameter space from the compensated master data set on a set of application fluids. A reverse transformation is obtained based on the node sensor responses in a complete set of calibration fluids. The reverse transformation converts each node sensor response from a tool parameter space to the synthetic parameter space, and uses transformed data as inputs of various fluid predictive models to obtain fluid characteristics. The method includes modifying operation parameters of a drilling or a well testing and sampling system according to the fluid characteristics.

25 Claims, 22 Drawing Sheets

(56) References Cited

U.S. PATENT DOCUMENTS

2008/0162098 A1 7/2008 Suarez-Rivera et al.
2014/0025301 A1 1/2014 Storm, Jr. et al.

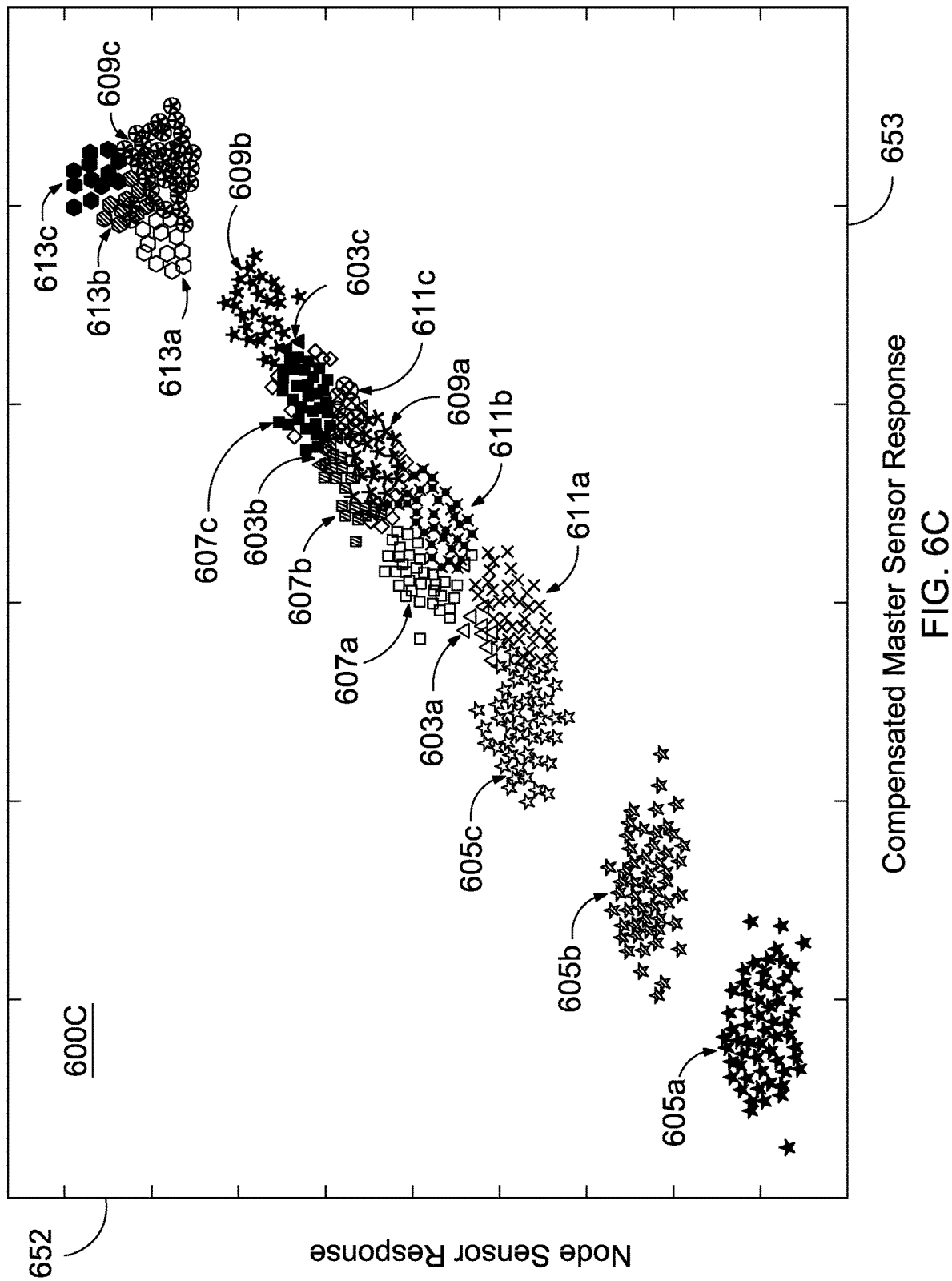

SYSTEM AND METHODS FOR CROSS-SENSOR LINEARIZATION

CROSS-REFERENCE TO RELATED APPLICATION

This application is a continuation of U.S. application Ser. No. 14/783,522, filed Oct. 9, 2015, which is a national stage application of International Patent Application No. PCT/US2014/072489, filed Dec. 29, 2014, all of which are hereby incorporated by reference in their entirety for all purposes.

BACKGROUND

Current practice in optical sensor calibration is typically performed on a sensor-by-sensor basis, applying a standard procedure to each optical sensor and using the same number of reference fluids for all optical sensors involved. Attempts to reduce the number of reference fluids in a calibration procedure may over-fit the selected data sets and fail to adequately generalize results for downhole application fluids. This is especially problematic for calibration techniques adopting a non-linear mapping algorithm. On the other hand, increasing the number of calibration fluids for each optical sensor has the drawback of low safety and high cost.

Adding to the complexity of current strategies for standardizing optical sensor response is the desire to perform reference measurements of calibration fluids at multiple temperature settings, multiple pressure settings, and different combinations of temperature and pressure settings. Combining measured and simulated optical sensor responses on reference fluids has been an attractive technique to solve the calibration and standardization problem. However, cross-correlation of optical sensor data from multiple reference fluids may be non-linear when no spectral correction is available for each optical sensor. When the cross-correlation is non-linear, it is difficult to develop a method applicable to additional reference fluids based on the measurements of a reduced number of reference fluids. What is missing in optical sensor calibration and standardization techniques is a cross-sensor data linearization method applicable over different optical element designs and different optical sensor configurations in optical tool parameter space.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

FIGS. 6A-6C illustrate a cross-sensor linearization procedure for a sensor channel including a Gas-Oil-Ratio (GOR) ICE.

DETAILED DESCRIPTION

Figure 1:
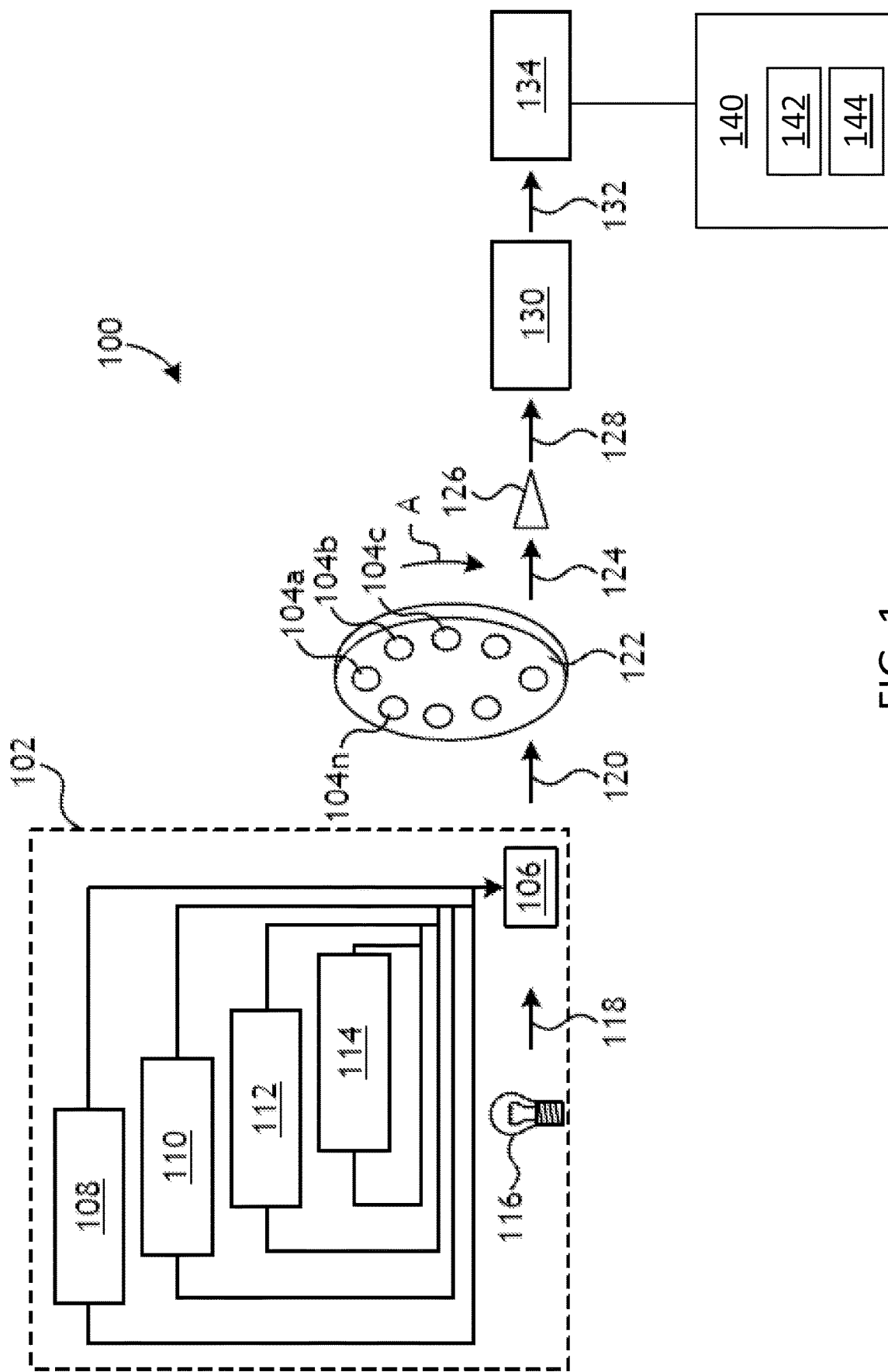
FIG. 1 illustrates a calibration system used to calibrate one or more optical elements.

The present disclosure relates to calibration of optical sensors for downhole optical fluid analysis and enhancement of optical sensor technology. More specifically, the present disclosure provides a method for cross-sensor linearization to improve tool standardization.

Optical computing devices, also commonly referred to as "opticoanalytical devices," can be used to analyze and monitor a substance in real time. Such optical computing devices will often employ an optical element or optical processing element that optically interacts with the substance or a sample thereof to determine quantitative and/or qualitative values of one or more physical or chemical properties of the substance. The optical element may be, for example, an integrated computational element (ICE), also known as a multivariate optical element (MOE), which is essentially an optical interference-based device that can be designed to operate over a continuum of wavelengths in the electromagnetic spectrum from the UV to mid-infrared (MIR) ranges, or any sub-set of that region. Electromagnetic radiation that optically interacts with a substance is changed and processed by the ICE so as to be readable by a detector, such that an output of the detector can be correlated to the physical or chemical property of the substance being analyzed. Other examples of optical elements may include band-pass filters, notch filters, neutral density filters, beamsplitters, polarizing beamsplitters, prisms, diffraction gratings, Fresnel lenses, and the like.

An ICE (hereafter "ICE core") typically includes a plurality of optical layers consisting of various materials whose index of refraction and size (e.g., thickness) may vary between each layer. An ICE core design refers to the number and thickness of the respective layers of the ICE core. The layers may be strategically deposited and sized to selectively pass predetermined fractions of electromagnetic radiation at different wavelengths configured to substantially mimic a regression vector corresponding to a particular physical or chemical property of interest of a substance. Accordingly, an ICE core design will exhibit a transmission function that is weighted with respect to wavelength. As a result, the output light intensity from the ICE core conveyed to a detector may be related to the physical or chemical property of interest for the substance.

The terms "optical computing device" and "optical sensor" are used herein interchangeably and refer generally to a sensor configured to receive an input of electromagnetic radiation that has interacted with a substance and produced an output of electromagnetic radiation from an optical element arranged within or otherwise forming part of the optical computing device. The processing element may be, for example, an ICE core as described above. Prior to field use, the optical computing device, and each optical element employed therein, is calibrated such that each is able to operate effectively upon being exposed to downhole conditions. When an optical computing device is not properly calibrated, the resulting transmission functions derived from each optical element may provide well operators with inaccurate measurements upon deployment.

After manufacture, and before being placed in downhole use, each optical computing device is carefully calibrated against known reference fluids for temperature and pressure ranges expected to be encountered in the field. The calibrated optical computing devices are then installed as part of a downhole tool and re-tested to validate the optical responses from the optical element.

Embodiments described herein provide methods and systems for calibrating and standardizing optical sensor response during tool validation testing and field testing. Moreover, the presently described methods improve tool standardization by using a cross-sensor linearization of optical channel responses associated with a plurality of optical sensors. More particularly, a method is provided for optical sensor standardization, which may be applicable to pressure-volume-temperature (PVT) characterization of a downhole fluid, for optical sensor manufacturing calibration, for tool validation testing, and for field data post-processing.

Downhole optical fluid processing often starts with data mapping to convert optical sensor measurements into compatible inputs of various pre-determined fluid characterization models. A fluid characterization model may include fluid composition models to determine the different components of a fluid, such as a Gas-Oil-Ratio (GOR), an aromatics content, or a saturated hydrocarbon content. In some embodiments, fluid composition models include property predictive models of the fluid, such as viscosity, density, or phase (solid, liquid, gas, or a combination). A data mapping algorithm, also called 'reverse transformation' or 'instrument standardization' algorithm, is built on a set of reference fluids through manufacturing calibration. To ruggedize downhole fluid analysis, quality data transformation through a reasonable selection of reference fluids is desirable to develop a reliable reverse transformation. Candidate reference fluids in general are chosen from good representatives of formation/petroleum fluids. Furthermore, reference fluids are measured over a wide range of temperature and pressure settings to better simulate downhole conditions while maintaining safe laboratory operating conditions. It is desirable to obtain a wide dynamic range in optical sensor responses during the calibration measurements. Embodiments disclosed herein allow a suitable trade-off between using an adequate number of reference fluids for robust calibration and minimizing total operational cost, according to the specific measurement conditions.

Embodiments consistent with the present disclosure include linearizing a cross-correlation of data from multiple sensors and for multiple reference fluids. In some embodiments, the data is obtained with optical sensors selected within the same fabrication/calibration batch. In some embodiments, the data is obtained from optical sensors selected among different fabrication batches and with the same design. In other embodiments, the data may be obtained from optical sensors selected among different designs having the same optical sensor configuration. In yet other embodiments, the data is obtained from optical sensors selected from different designs, having different sensor configurations.

In some embodiments, calibration against a full-set of reference fluids is performed on a selected number of 'master sensors' during manufacturing. Other sensors in the manufacturing batch, or in a different batch, are calibrated against a reduced-set of reference fluids. These sensors are referred to as 'node sensors.' The reduced-set of reference fluids may be a plurality of reference fluids that are safe and cost-effective to operate in laboratory conditions. A reverse transformation algorithm is built using data collected from the full-set of reference fluids. To obtain the reverse transformation, master sensor data may include only measured optical responses on the full-set of reference fluids. On the other hand, node sensor data may include a hybrid set having measured optical responses from the reduced-set of reference fluids, and simulated optical responses from reference fluids in the full-set of reference fluids that are not included in the reduced-set of reference fluids. In that regard, some embodiments use a linear or near-linear transformation algorithm using compensated master sensor responses as input for simulating the optical responses for node sensors against the reference fluids in the full-set of reference fluids. The transformation algorithm is based on a channel-by-channel data correlation on the reduced-set of reference fluids between the master sensor and the node sensor. The specific type of optical element used in optical sensors according to embodiments disclosed herein may include ICE cores or other types of optical devices or elements, such as narrow band-pass (NBP) filters and the like. In general, embodiments disclosed herein are consistent with any type of optical device or element used in an optical sensor. Embodiments of the present disclosure are particularly desirable when a non-linear correlation between a master sensor response and a node sensor response is observed for a reduced-set of reference fluids.

In some embodiments, a method includes obtaining a plurality of master sensor responses with a master sensor in a set of training fluids and obtaining node sensor responses in the set of training fluids. The method further includes finding a linear correlation between a compensated master data set and a node data set for a set of training fluids and generating node sensor responses in a tool parameter space from the compensated master data set on a set of application fluids. Further, the method includes obtaining a reverse transformation based on the node sensor responses in a complete set of calibration fluids, the reverse transformation transforming each node sensor response from a tool parameter space to the synthetic parameter space and obtaining fluid characteristics using reverse-transformed inputs. The method includes modifying operation parameters of a drilling or a well testing and sampling according to the fluid characteristics.

In some embodiments, a method includes determining an estimated value for a node sensor response in synthetic parameter space using a two-dimensional interpolation for temperature and pressure, and determining an estimated value for a master sensor response in synthetic parameter space using the two dimensional interpolation for temperature and pressure. The method further includes determining a difference between the estimated value for a node sensor response and the estimated value for a master sensor response, determining a set of cross-sensor linearized model coefficients in an optimization loop, and adjusting a master sensor channel selection to simulate a particular channel response of the node sensor. Further, the method includes storing a set of cross-sensor linearized model coefficients for a node sensor channel, and modifying operation parameters of a drilling or a well testing and sampling according to a fluid characteristic obtained with a reverse transformation and a synthetic fluid predictive model. The reverse transformation is obtained using the stored set of cross-sensor linearized model coefficients.

In yet other embodiments, a method, includes introducing a tool into a wellbore drilled into one or more subterranean formations, the tool having been previously calibrated for operation by performing a number of steps. The steps for calibrating the tool may include: obtaining a plurality of master sensor responses with a master sensor in a set of training fluids, obtaining a plurality of node sensor responses with a plurality of node sensors in the set of training fluids, each of the plurality of node sensors and the master sensor including an optical element, finding a linear correlation between a compensated master data set and a node data set for a set of training fluids, generating a plurality of node sensor responses in a tool parameter space from the compensated master data set on a set of application fluids, and obtaining a reverse transformation based on the plurality of node sensor responses in a complete set of calibration fluids, wherein the complete set of calibration fluids comprises the set of training fluids and the set of application fluids. The method further includes determining a fluid characteristic from the plurality of node sensor responses in the synthetic parameter space using the reverse transformation and a synthetic fluid predictive model, and modifying operation parameters of a drilling or a well testing and sampling according to the fluid characteristic.

FIG. 1 illustrates an exemplary manufacturing calibration system 100 that may be used to calibrate one or more optical elements used in an optical sensor. As illustrated, system 100 may include a measurement system 102 in optical communication with one or more optical elements 104 (shown as 104a, 104b, 104c . . . 104n) that are to be calibrated. Each optical element 104a-n may be either an optical band-pass filter or a multivariate optical element/integrated computational element (e.g., an ICE core). The measurement system 102 may circulate one or more reference fluids with different chemical compositions and properties (i.e., methane concentration, aromatics concentration, saturates concentration, GOR, etc.) through an optic cell 106 over widely varying calibration conditions of temperature, pressure, and density, such that optical transmission and/or reflection measurements of each reference fluid in conjunction with each optical element 104a-n may be made at such conditions.

The measurement system 102 may comprise an optical pressure-volume-temperature (PVT) instrument, and the reference fluids circulated in the measurement system 102 may comprise representative fluids commonly encountered in downhole applications. System 100 may collect output signals from each optical element 104a-n for each specified reference fluid at varying calibration conditions. In some cases, the reference fluids may comprise seven representative fluids that are easy to operate for manufacturing calibration, namely, dodecane, nitrogen, water, toluene, 1-5 pentanediol, and two liquid crude oils or fluids with no gas concentration (e.g., dead oil). The crude reservoir oils used as reference fluids may be, for example, global oil library 13 (or "GOL13"), and global oil library 33 (or "GOL33"). In other cases, the reference fluids may include samples of live oils mixed with dead oil and hydrocarbon gas, such as methane for example, and the samples of hydrocarbon gases and/or $CO_2$. Manufacturing calibration of the optical sensor may serve the need of detector output re-scaling or instrument standardization.

The measurement system 102 may vary each reference fluid over several set points spanning varying calibration conditions. To accomplish this, as illustrated, the measurement system 102 may include a liquid charging system 108, a gas charging system 110, a temperature control system 112, and a pressure control system 114. The liquid charging system 108 injects reference fluids into the fluid circuit to introduce fluid varying perturbations such that calibrating the optical elements 104a-n will incorporate all the expected compounds found in the particular reference fluid. The gas charging system 110 may inject known gases (e.g., $N_2$, $CO_2$, $H_2S$, methane, propane, ethane, butane, combinations thereof, and the like) into the circulating reference fluids. The temperature control system 112 may vary the temperature of the reference fluid to simulate several temperature set points that the optical elements 104a-n may encounter downhole. Lastly, the pressure control system 114 may vary the pressure of the reference fluid to simulate several pressure set points that the optical elements 104a-n may encounter downhole.

The optic cell 106 is fluidly coupled to each system 108, 110, 112, and 114 to allow the reference fluids to flow therethrough and recirculate back to each of the systems 108, 110, 112, and 114 in a continuous, closed-loop fluid circuit. While circulating through the optic cell 106, a light source 116 emits electromagnetic radiation 118 that passes through the optic cell 106 and the reference fluid flowing therethrough. As the electromagnetic radiation 118 passes through the optic cell 106 it optically interacts with the reference fluid and generates sample interacted light 120, which includes spectral data for the particular reference fluid circulating through the measurement system 102 at the given calibration conditions or set points. The sample interacted light 120 may be directed toward optical elements 104a-n which, as illustrated, may be arranged or otherwise disposed on a sensor wheel 122 configured to rotate in the direction A. While shown as arranged in a single ring on the sensor wheel 122, optical elements 104a-n may alternatively be arranged in two or more rings on the sensor wheel 122.

During calibration, the sensor wheel 122 may be rotated at a predetermined frequency such that each optical element 104a-n may optically interact with the sample interacted light 120 for a brief period and sequentially produce optically interacted light 124 that is conveyed to a detector 126. The detector 126 may be generally characterized as an optical transducer and may comprise, but is not limited to, a thermal detector (e.g., a thermopile), a photoacoustic detector, a semiconductor detector, a piezo-electric detector, a charge coupled device (CCD) detector, a video or array detector, a split detector, a photon detector (e.g., a photomultiplier tube), photodiodes, and any combination thereof. Upon receiving individually-detected beams of optically interacted light 124 from each optical element 104a-n, the detector 126 may generate or otherwise convey corresponding response signals 128 to a data acquisition system 130. The data acquisition system 130 may time multiplex each response signal 128 received from the detector 126 corresponding to each optical element 104*a-n*. A corresponding set of resulting output signals 132 is subsequently generated and conveyed to a data analysis system 134 for processing and providing input parameters for various fluid predictive models with use of outputs from each optical element 104*a-n* as a candidate variable. Data analysis system 134 may be coupled to a computer 140, which may include a memory 142 and a processor 144. Memory 142 may store commands which, when executed by processor 144, cause computer 140 to perform at least some of the steps in the methods described herein and otherwise consistent with the present disclosure.

Once the sensor wheel 122 is calibrated, one or more calibrated sensor wheels 122 may then be installed on an optical tool with other system components and otherwise placed in an optical computing device for assembly validation testing. To validate the optical response of the tool assembly, the optical tool may be placed in an oven that regulates the ambient temperature and pressure. The reference fluids used to calibrate the sensor wheel 122 may then be selectively circulated through the optical tool at similar set points used to calibrate the optical elements 104*a-n*. More particularly, the reference fluids may be circulated through the optical tool at various set point downhole conditions (i.e., elevated pressures and temperatures) to obtain measured optical responses.

While manufacturing calibration of the sensor wheel 104*a-n* using reference fluids is performed in a tool parameter space, fluid spectroscopic analysis and fluid predictive model calibration using a large amount of data in a standard oil library is performed in a synthetic parameter space (also called Optical-PVT data space). Synthetic sensor responses of each element are calculated as a dot product of full-wavelength-range of fluid spectrometry and sensor element spectrum excited by a light source, which might nonlinearly or linearly vary in scale compared to the actual sensor response due to the difference between the mathematic approximation used in calculating synthetic sensor response and the real system implementation. To compensate for the difference above, the measurement data from the optical tool can be transformed from the tool parameter space to the synthetic parameter space first through a reverse transformation algorithm before applying fluid predictive models. Also, fluid predictive models can be calibrated with different synthetic optical inputs and saved in an optical fluid model base to provide sufficiency and adaptation in dealing with uncertainty of data transformation and improving formation fluid compositional analysis and field data interpretation.

In current practice, an optical fluid model is sensor dependent, including data transformation (i.e., standardization) models and property predictive models. To provide adequate flexibility for optical data processing and interpretation, an optical fluid model includes the following candidate constituents: transformation models calibrated on selected reference fluids through reverse transformation, transformation models calibrated on selected reference fluids through forward transformation, and predictive models calibrated on both Optical-PVT database and sensor wheel 122 data spaces.

Figure 2:
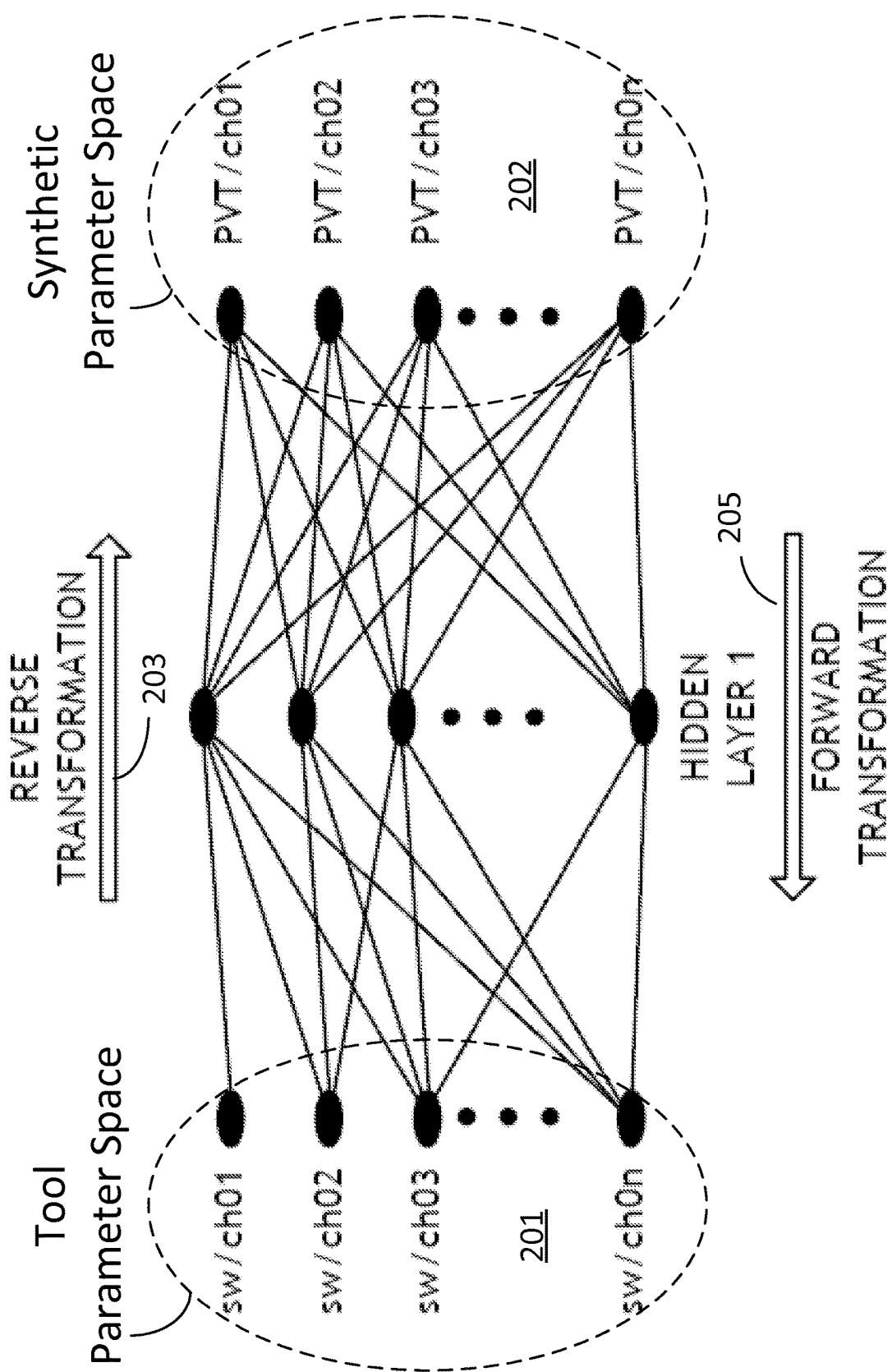
FIG. 2 illustrates a general transformation model framework including a forward transformation and a reverse transformation with neural networks.

Transformation model development using selected reference fluids requires matched calibration data pairs of optical sensor responses simulated in the synthetic parameter space and measured in a tool data space of sensor wheel 122. In synthetic parameter space, simulated sensor responses on reference fluids are available at the ideal temperature and pressure setting points. Measured optical responses of the sensor wheel 122 may endure slight temperature and pressure variation during manufacturing calibration. In some embodiments, matched transformation data pairs are obtained through two-dimensional interpolation by using actual temperatures and pressures as inputs to generate simulated sensor responses at the corresponding measurement conditions. Depending on the data space in which the fluid property predictive models are calibrated, data transformation models convert measured or simulated optical sensor output between a tool data space and a synthetic parameter space. FIG. 2 illustrates one such transformation.

More particularly, FIG. 2 illustrates an embodiment of a general transformation model framework with a multi-input, multi-output neural network that may be applied by the data analysis system 134 of FIG. 1 to optical responses. The model that converts the actual optical sensor response channels (SW/Ch01-Ch0n) from tool parameter space 201 to synthetic parameter space 202 (PVT/Ch01-Ch0n) is a reverse transformation 203. The model that converts data from synthetic parameter space 202 into tool parameter space 201 is a forward transformation 205. Although the illustrated general transformation model framework in FIG. 2 is configured with multi-input/multi-output non-linear neural networks, there is no limitation in using other non-linear and linear transformation algorithms with single-input/single-output and multi-input/single-output configurations.

Figure 3:
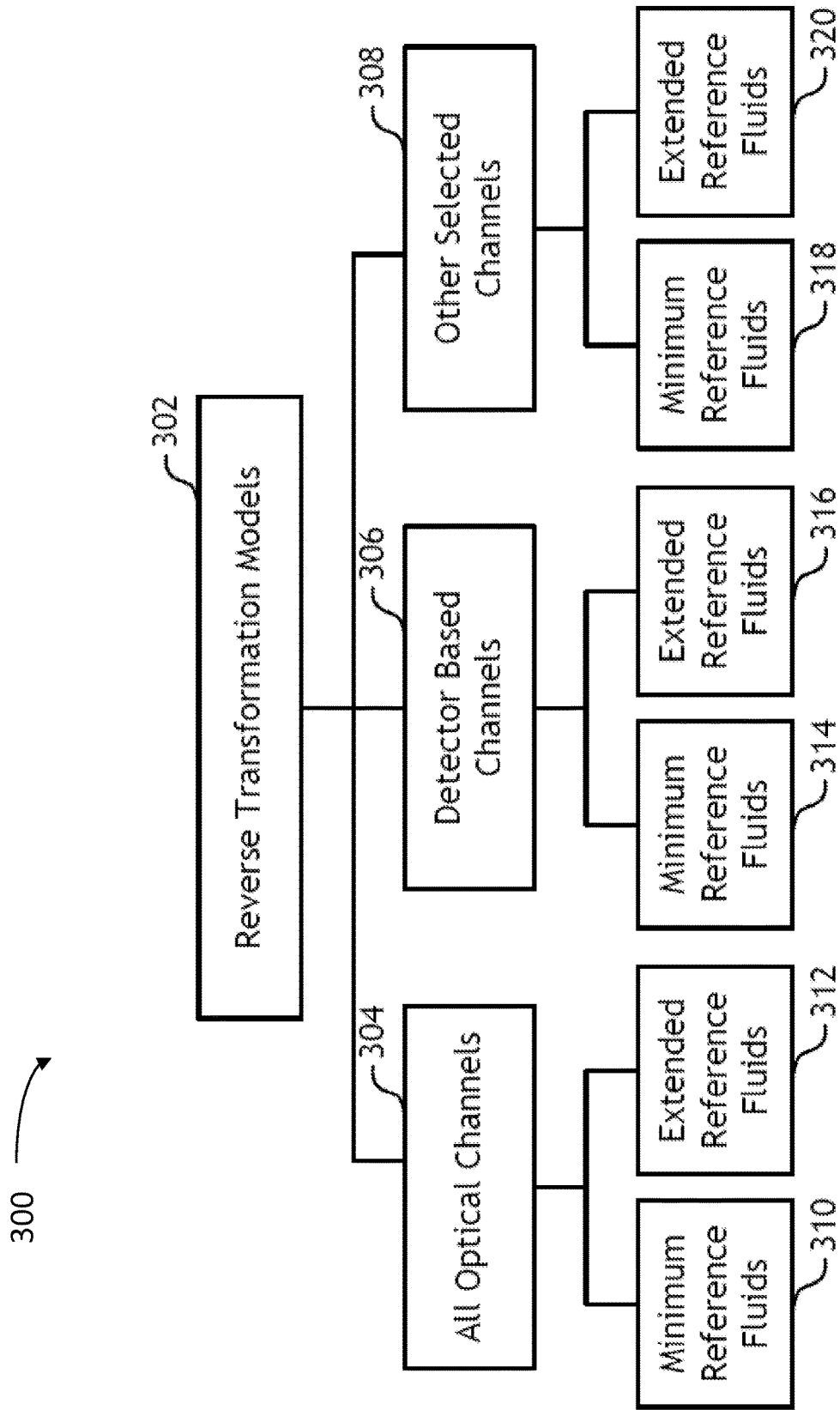
FIG. 3 depicts a hierarchical structure for reverse transformation models.

FIG. 3 illustrates an embodiment of a hierarchical structure for reverse transformation models 302. The variations of transformation models 302 may include converting optical channels 304 for each optical sensor in a single model, converting the disjoined optical channels in several detector-based models 306, or converting only selected channels 308 of interest each time in different individual models. Compared to a single model implementation, multi-model options can improve the reliability of data construction in the output (i.e., transformed) parameter domain (e.g., synthetic parameter space 202, cf. FIG. 2) if one or more of the optical channels (e.g., tool parameter space 201, cf. FIG. 2), as a transformation input, experience a problem. A plurality of reference fluid blocks 310-320, at the bottom of the hierarchical structure and coupled to the various channels 304-308, represent the transformation models that can be built based on different reference fluids (e.g., minimum number of reference fluids 310, 314, 318 and extended reference fluids 312, 316, 320). The minimum number of reference fluids may refer to the seven representative fluids discussed above. These reference fluids are safe to use in a laboratory configuration and easy to clean for testing purposes. Optical sensor responses (e.g., tool parameter space 201) generally have a wide dynamic range as a representation of diverse fluids in an existing Optical-PVT database. Extended reference fluids often include one or more fluids such as live oil and/or gas to cover a wider dynamic range and provide a more robust transformation model.

In some embodiments, reverse transformation 203 converts tool measurements from tool parameter space 201 into synthetic parameter space 202 prior to applying fluid characterization models. Accordingly, fluid characterization models use data from synthetic parameter space 202 as input to obtain information such as fluid composition, and physical properties of the fluid. A forward transformation 205 can be used to convert a whole set of simulated optical sensor responses from synthetic parameter space 202 to tool parameter space 201 prior to developing predictive models on tool parameter space 201. As seen in FIG. 2, forward transformation 205 can be created by switching the input and the output of a neural network model. In other words, using a synthetic-channel response as an input, and a measured sensor wheel channel response as an output a neural network can then be trained to calibrate forward transformation algorithms.

As will be appreciated, a hierarchical structure for the reverse transformation models 302, as illustrated in FIG. 3, can also be applied to forward transformation models. After forward transformation 205 is developed, it can be used to convert the synthetic sensor responses of the global samples in synthetic parameter space 202 into tool parameter space 201. Then the fluid property predictive models can be calibrated in tool parameter space 201, and the further transformation is not needed in field data processing because measured optical responses from the tool can be used as model inputs directly for fluid compositional analysis. Compared to the reverse transformation, which applies on-line tool data conversion each time before making a fluid prediction, forward transformation usually only applies one time off-line to convert synthetic sensor responses for fluid prediction model development.

By applying a transformation model to the optical responses derived from the optical sensor, the optical sensor is calibrated for use and ready for validation testing in any number of downhole tools. Such a sensor, calibrated over a full set of reference fluids, may be characterized and otherwise referred to herein as a 'master sensor'. During tool validation testing, one or more master sensors may be installed in a tool that is to be introduced downhole to obtain wellbore measurements. In some embodiments, as described below, the downhole tool may form part of a bottom hole assembly used in a drilling operation. In such embodiments, the tool may comprise any of a number of different types of tools including MWD (measurement-while-drilling) tools, LWD (logging-while-drilling) tools, and others. In other embodiments, however, the tool may be used in a wireline operation and otherwise form part of a wireline logging tool, such as a probe or sonde, to be lowered by wireline or logging cable into a borehole to obtain measurements.

In some embodiments, an optical sensor installed in a tool may be characterized as a 'node sensor,' and at least some reference fluids that were used to calibrate the master sensor may be run through the node sensor at the same or similar set points (i.e., elevated pressures and temperatures). In some embodiments, the tool validation testing is undertaken at a laboratory facility. In such cases, the same reference fluids used to calibrate the optical sensor may be used. In other cases, however, or in addition to laboratory testing, tool validation testing may be undertaken on-site, such as at a drill rig or wellhead installation where the tool is to be used in a wellbore operation. In such cases, a limited number of reference fluids may be used, such as water and nitrogen. Optical responses derived from the tool during validation testing may be normalized by using the transformation model (e.g., reverse transformation 203, forward transformation 205) to adjust the output of the tool validation process. The optical responses may then be compared against the optical responses of the master sensor.

Figure 4:
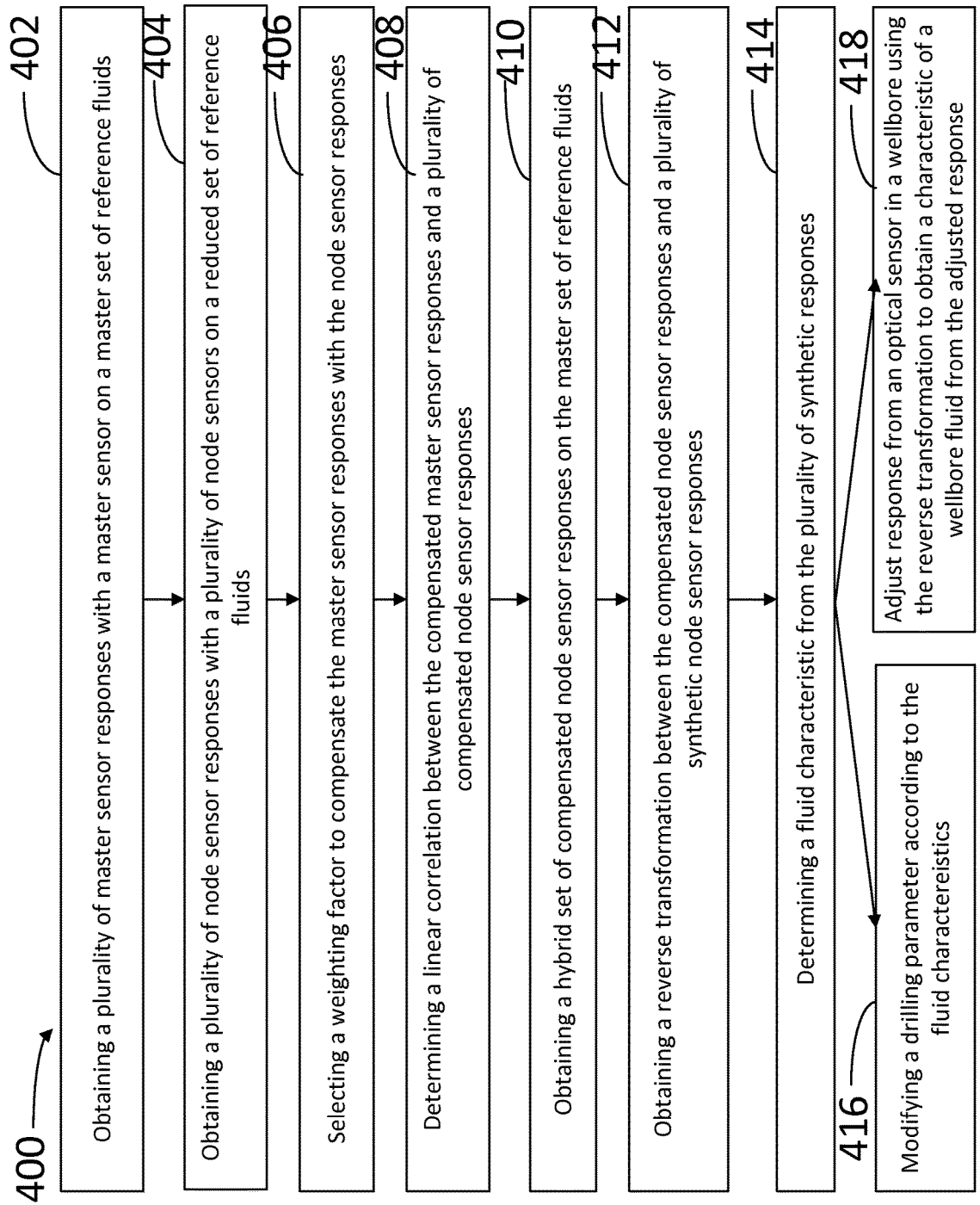
FIG. 4 illustrates a schematic flowchart of a general method for cross-sensor linearization, and its application for improving reverse transformation and fluid characterization.

FIG. 4 illustrates a flowchart including steps in a general method 400 for cross-sensor linearization and its application for improving reverse transformation and fluid characterization, according to some embodiments. Method 400 may be performed by a computer device having a memory and a processor (e.g., computer 140, memory 142, and processor 144, cf. FIG. 1). The memory may store commands that, when executed by the processor, cause the computer to perform at least some of the steps in method 400. Methods consistent with method 400 may include at least one but not all of the steps in method 400, performed in any order. Furthermore, methods consistent with the scope of method 400 may include at least some of the steps in method 400 performed overlapping in time, or even simultaneously. Methods consistent with method 400 may include measuring reference fluids with a measurement system using an optical sensor having a plurality of optical elements (e.g., measurement system 102 and optical elements 104a-n, cf. FIG. 1). In some embodiments, the plurality of optical elements in method 400 may correspond to the same optical sensor, or may belong to different optical sensors. Accordingly, the plurality of optical elements in method 400 may be selected within the same fabrication batch, among the different fabrication batches, within the same optical element design, among different optical element designs, within the same sensor configuration or among different sensor configurations. In some embodiments, the measurement system in method 400 may include a reverse transformation or a forward transformation between sensor responses in tool parameter space and sensor responses in synthetic parameter space (e.g., tool parameter space 201, synthetic parameter space 202, reverse transformation 203, and forward transformation 205).

Step 402 includes obtaining a plurality of master sensor responses, $P_m$, with a master sensor on a set of training fluids. In some embodiments, the set of training fluids is master set of reference fluids including a representative or comprehensive set of reference fluids for a downhole oil and gas exploration measurement. Step 404 includes obtaining a plurality of node sensor responses, $P_n$, with a plurality of node sensors on the set of training fluids. In some embodiments, the set of training fluids is a reduced set of reference fluids such as a sub-set of the master set of reference fluids. Accordingly, in some embodiments the master sensor and the node sensors each measure the reduced set of reference fluids.

Step 406 includes selecting a weighting factor, C, to calculate a plurality of compensated master sensor responses with the plurality of node sensor responses. In some embodiments, step 406 includes master and node sensor responses for the reduced set of reference fluids, which is common to both master and node sensors. Accordingly, step 406 includes obtaining compensated master sensor responses by adding the actual measured master sensor responses to the reduced set of reference fluids to a weighted difference between a node sensor response in synthetic parameter space and a master sensor response in synthetic parameter space. Sensor responses in synthetic parameter space are the Optical-PVT responses used for fluid product calibration (cf. synthetic parameter space 202, FIG. 2). In some embodiments, step 406 may include determining the spectral response of at least one optical element (e.g., an ICE) in the optical sensor at either elevated temperature and pressure, or room temperature and pressure.

The weighted difference between responses from the master sensor and the node sensors in synthetic parameter space incorporates cross-sensor variations in optical signal intensity induced by a variation of the optical elements. The variation between optical elements may be a result of manufacturing fluctuations within the same fabrication batch. In some embodiments, the variation between optical elements may be a result of variations between different designs of the optical elements. In yet other embodiments, the variations between optical elements may be a result of different optical sensor configuration. In some embodiments, step 406 includes selecting a weighting factor, C, in a mathematical equation as shown below:

$$P_{cm} = P_m + C \cdot (S_n - S_m) \quad (1)$$

where $P_{cm}$ is the compensated master sensor response on the reduced set of reference fluids in tool parameter space; and $S_n$ and $S_m$ are the node sensor and master sensor responses, respectively, in the synthetic parameter space on the same reduced set of reference fluids. The sensor response in synthetic parameter space at each channel is a dot product (scalar product) of a fluid spectroscopic response vector ($R_{fl}$) and a convolved spectroscopic response vector of a particular optical element ($R_{oe}$). In some embodiments, $R_{fl}$ and $R_{oe}$ are vectors in a wavelength parameter space. In that regard, the convolved spectroscopic response may include a spectral emissivity of light source 116 (FIG. 1), a band pass filter transmittance, or any other spectroscopic response of the optical element. Accordingly, in some embodiments step 406 includes performing mathematical operations in the following equation to find the synthetic node sensor and master sensor response ($S_{n,m}$):

$$S_{n,m} = R_{fl} \cdot R_{n,m} \quad (2)$$

Since the fluid spectroscopy ($R_{fl}$) is the same for $S_n$ and for $S_m$, the difference of ($S_n - S_m$) indicates the variation of convolved transmittance spectrum of node and master sensor elements ($R_{n,m}$). The weighting factor C in Eq. (1) is channel dependent. In some embodiments, step 406 includes selecting a weighting factor C in Eq. (1) from a validated range (between −3 to +3 with an increment step of 0.1 for example) to optimize a linear correlation between the compensated master sensor responses obtained from Eq. (1) and the node sensor responses associated with the reduced set of reference fluids. Using the selected weighting factor C for each optical channel, a linear model correlating master sensor responses with node sensor responses for the reduced set of reference fluids is obtained in step 408.

Step 408 includes finding a linear correlation between the compensated master data set and the node data set for a set of training fluids. More particularly, step 408 includes determining a linear correlation between the compensated master sensor responses and a plurality of measured node sensor responses, as follows:

$$P_n = k \cdot P_{cm} + b \quad (3)$$

In some embodiments, the linear correlation expressed in Eq. (3) involves node sensor responses $P_n$ in tool parameter space. In some embodiments, step 408 includes testing the linear correlation in Eq. 3 with a selected value of C, according to step 406. When a new value of C in step 406 renders a better linearization according to step 408, the new value of C is preferred over the old value. When a selected value of C optimizes the linear Eq. (3) on the reduced reference fluids, node sensor responses on additional reference fluids would be robust against different variations of the optical elements. In some embodiments, step 408 includes constructing synthetic node sensor responses over the master set of reference fluids, using Eq. (2). The synthetic response set may be denoted as:

$$S_{nf} = [S_n S_{nr}]$$

where $S_{nf}$ is the full set of synthetic node sensor responses, $S_n$ includes the synthetic node sensor responses corresponding to the reduced set of reference fluids, and $S_{nr}$ includes the node sensor responses in synthetic parameter space corresponding to the reference fluids in the master set that are not included in the reduced set. In some embodiments, obtaining the response set $S_{nr}$ in synthetic parameter space as illustrated above may include performing mathematical operations including vectors $R_{fl}$ and $R_n$ (cf. Eq. 2), which are known from laboratory measurements or which may be retrieved from library databases.

Step 410 includes generating a plurality of node sensor responses in a tool parameter space from the compensated master data set on a set of application fluids. Step 410 includes calculating node sensor responses on additional fluids to complete the master set of reference fluids. After parameters C, k and b are determined on the reduced reference fluids (training fluids), embodiments consistent with the present disclosure simulate node sensor responses on additional reference fluids (application fluids) using the parameters C, k, and b (cf. Eqs. (1) and (3)). Step 410 includes obtaining a hybrid set of node sensor responses in the tool parameter space for the master set of reference fluids. The hybrid set may be denoted as:

$$P_{nf} = [P_n P_{nr}]$$

where $P_n$ are the node sensor responses in tool parameter space for reference fluids in the reduced set, and $P_{nr}$ are estimated node sensor responses for reference fluids in the master set that are not included in the reduced set. To obtain the set $P_{nr}$, in some embodiments, step 410 may include using the set $S_{nr}$ and $S_{mr}$ obtained in step 408 to determine a set of compensated master responses according to Eq. (1), where the value of C is already selected. Once the compensated master sensor responses are known, step 410 may include using the linear coefficients (k and b, cf. Eq. 3) found in step 408, to obtain the node sensor responses in tool parameter space for the full set of reference fluids.

This application is especially useful for non-linear neural network based reverse transformation, in which multi-input and multi-output mapping can be better implemented with wider range of data to robustly convert tool measurement data to the synthetic parameter space prior applying fluid composition and property predictive models.

Step 412 includes obtaining a reverse transformation based on the plurality of node sensor responses on a complete set of calibration fluids. According to some embodiments, the complete set of calibration fluids comprises the set of training fluids and the set of application fluids. Step 412 includes obtaining a reverse transformation, f, between a plurality of node sensor responses in tool parameter space $P_{nf}$ and a plurality node sensor responses $S_{nf}$ in synthetic parameter space. After simulated optical responses on additional reference fluids for node sensors are calculated, the reverse transformation algorithm converting optical responses from tool parameter space to synthetic parameter space for the full-set of reference fluids can be built. Step 412 may include performing non-linear (as shown in FIG. 2) or linear regression analysis. Accordingly, a calibrated node sensor response may be obtained using the reverse transformation, f, as follows:

$$S_{nf} = f(P_{nf}) \quad (4)$$

Step 414 includes obtaining fluid characteristics with synthetic fluid predictive models using reverse-transformed inputs from at least one of the node sensor responses to a fluid measurement. In some embodiments, step 414 includes implementing improved reverse transformation algorithms and existing fluid characterization models on real-time data processing software for downhole optical fluid analysis. When optical data associated with formation fluids is collected with downhole optical tool, it is input to reverse transformation algorithm (e.g., function fin Eq. (4)), then applied to pre-calibrated various fluid predictive models in determining fluid characteristics from the plurality of transformed optical responses. Fluid predictive models are typically calibrated with synthetic optical sensor responses on large number of fluid samples and diverse analyte data. In some embodiments, step 414 may include at least one of developing, modifying, or using a fluid characterization algorithm in tool parameter space when actual optical responses of adequate number of petroleum fluids is collected on a typical master sensor or multiple sensors. Simulated node sensor responses would include more petroleum fluids by using a cross-sensor data correlation analysis as described in steps 402-414. Moreover, step 414 may include calibrating fluid composition and property predictive models using data in the tool parameter space directly with no need of reverse transformation during field data processing. Accordingly, in some embodiments the reverse transformation 'f' of Eq. (4) may be used to convert validated field data from the tool parameter space to synthetic parameter space. The transformed field data may then be combined with existing lab data in synthetic parameter space, and directly incorporated into the development of fluid characterization models, including fluid composition and property predictive models.

Step 416 includes modifying operation parameters for drilling or well testing and sampling system according to the estimated fluid characteristics. A drilling parameter may be a drilling speed, a drilling configuration, such as steering the drill bit between a vertical or quasi-vertical drilling configuration and a horizontal or quasi-horizontal drilling configuration. Further according to some embodiments, step 416 may include adjusting the port, rate and direction of pumpout during well testing after the drilling is completed to improve the fluid sampling and contamination analysis.

A downhole optical tool according to embodiments disclosed herein is used with formation testing and sampling after drilling is complete. Accordingly, in some embodiments step 418 includes processing optical sensor measurements with optional data correction and standardization algorithms to minimize the uncertainty of reverse transformation, and obtaining a robust estimation of the fluid characteristics to help decision-making.

FIGS. 5A-5C, FIGS. 6A-6C, FIGS. 7A-7C, and FIGS. 8A-8C demonstrate the applications of the disclosed methods in four different scenarios, respectively. There are three subplots in each set of figures. The first subplot (FIGS. 5A, 6A, 7A, and 8A) compares the difference of the convolved transmittance spectrum of ICE element between the master and node sensor. The second subplot (FIGS. 5B, 6B, 7B, and 8B) shows the master-node data correlation without spectra correction. The third subplot (FIGS. 5C, 6C, 7C, and 8C) shows the linearized master-node data correlation using the invented method.

Figure 5A:
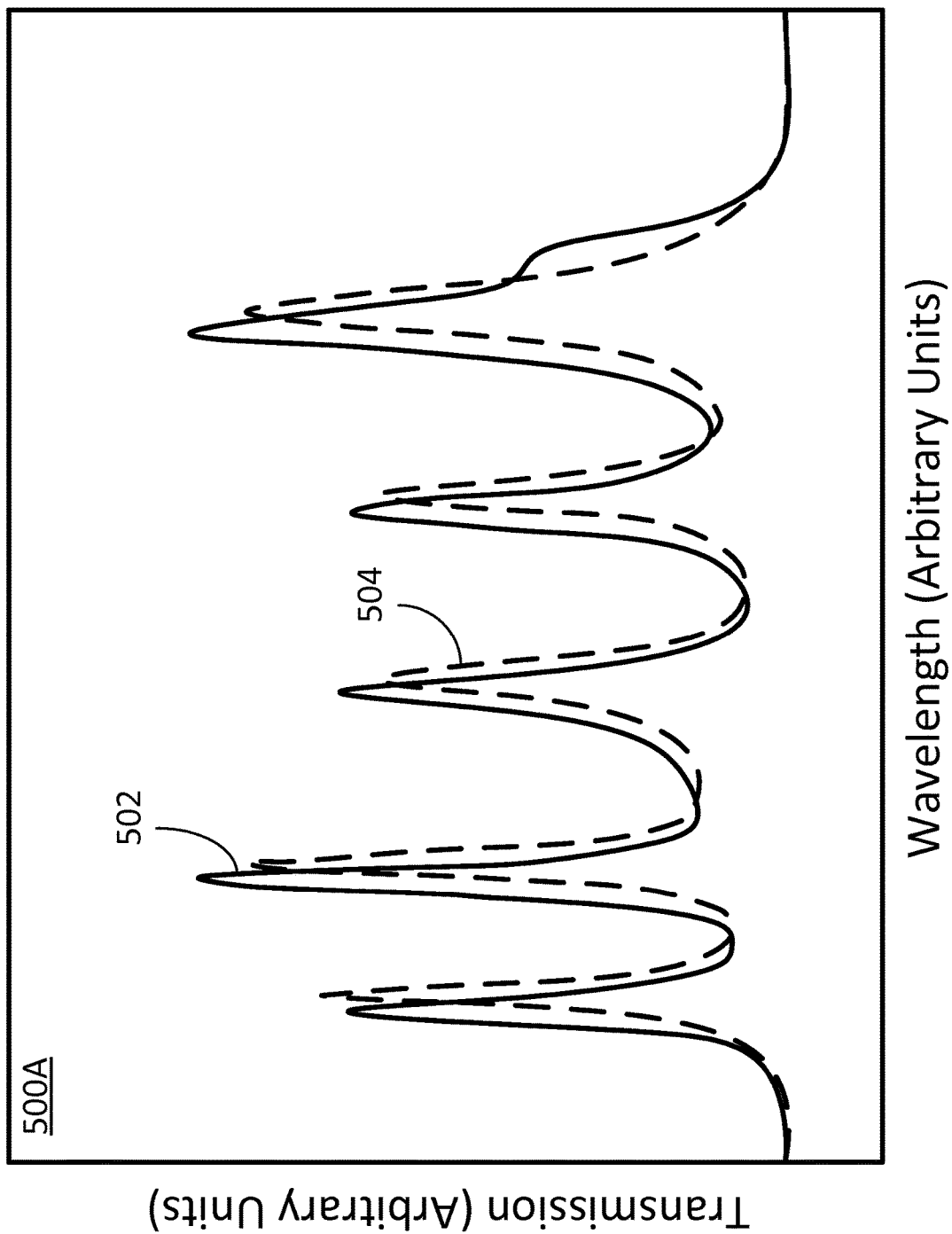
FIGS. 5A-5C illustrate a cross-sensor linearization procedure for a sensor channel including an integrated computational element (ICE) for measuring methane ('methane ICE').
Figure 5B:
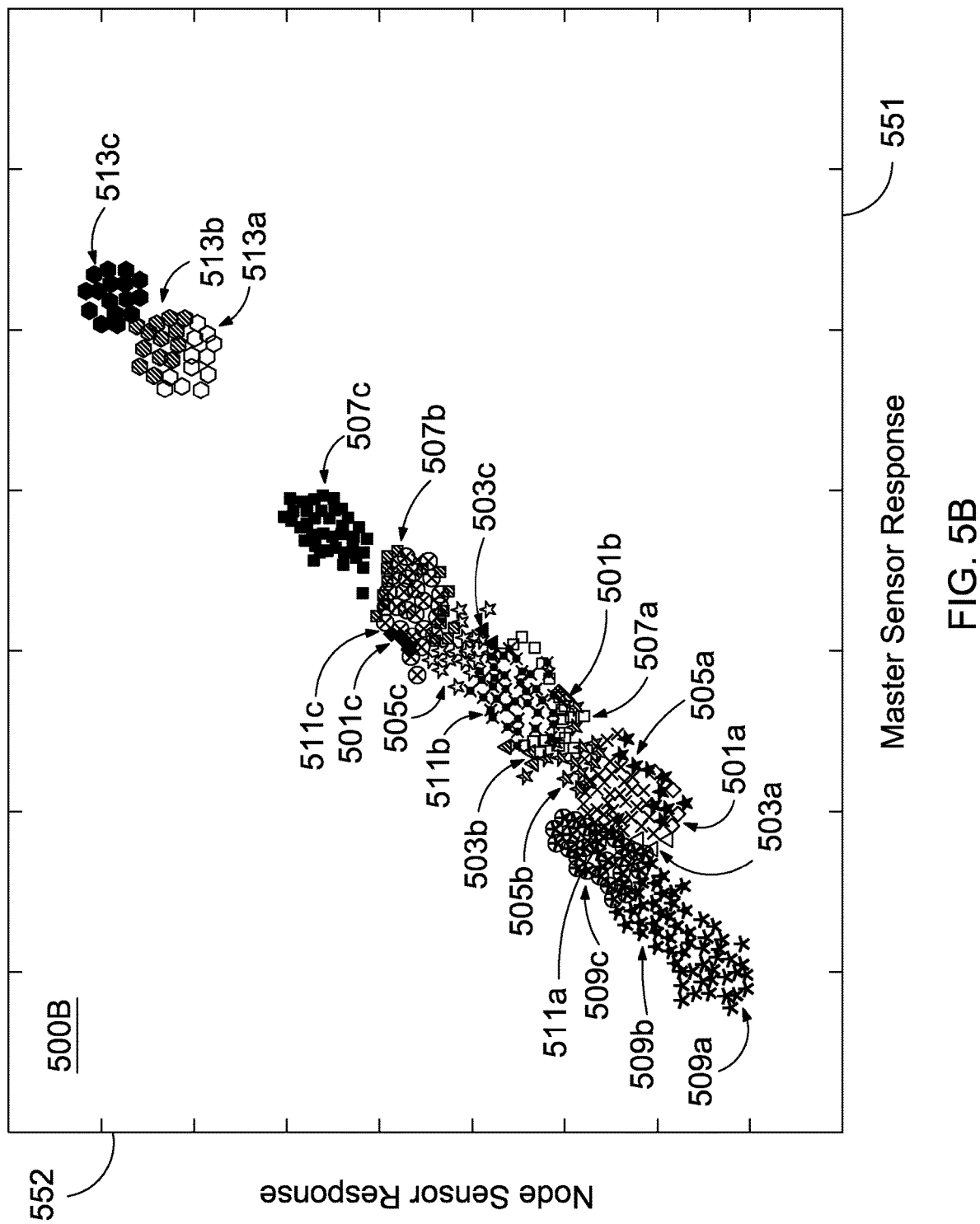
Figure 5C:
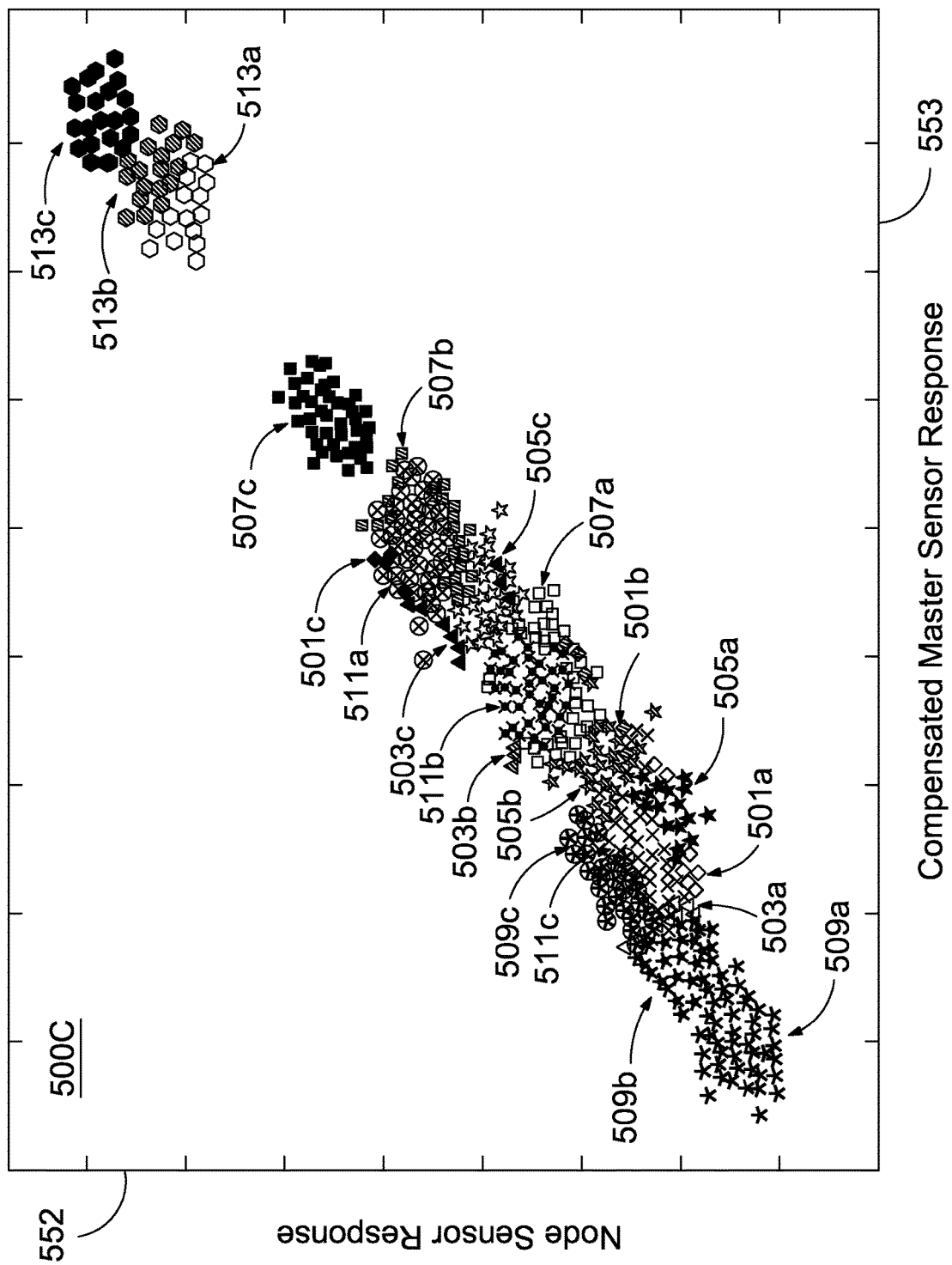

FIGS. 5A-5C illustrate a cross-sensor linearization procedure for a sensor channel including a methane ICE, according to some embodiments. More particularly, FIGS. 5A-5C illustrate a scenario in which the master sensor and node sensor are selected from the same batch of manufacturing calibration with little temperature and pressure variation for each data pair. The sensor configurations are the same, and the optical element design is also the same. Without limitation, the optical element in FIGS. 5A-5C is a methane ICE on the master and node sensors.

FIG. 5A illustrates chart 500A with a master sensor spectral response 502 and a node sensor spectral response 504. Chart 500A includes wavelength in the abscissae and transmission in the ordinates. Spectral responses 502 and 504 may be used in $R_{n,m}$ for the calculation of the sensor response in synthetic parameter space (cf. Eq. (2) above).

FIG. 5B illustrates chart 500B with a data cross-correlation between the master sensor and the node sensor illustrated in FIG. 5A. Accordingly, the abscissae 551 in chart 500B correspond to the master sensor responses in tool parameter space. The ordinates 552 in chart 500B correspond to the node sensor responses in tool parameter space. The multiple data points in chart 500B correspond to a reduced set of reference fluids, and are clustered as follows: data clusters 501a-c correspond to GOL33; data clusters 503a-c correspond to GOL13; data clusters 505a-c correspond to $H_2O$ (water); data clusters 507a-c correspond to toluene; data clusters 509a-c correspond to 1-5 pentanediol (PEN); data clusters 511a-c correspond to dodecane (DOD); and data clusters 513a-c correspond to $N_2$ (nitrogen). For each set a-c of data clusters, a different combination of temperature and pressure settings was used to measure the specific reference fluid. The typical temperature and pressure setting points may include combinations of three temperatures (150, 200, 250 Fahrenheit) and four pressures (3000, 6000, 9000 and 12000 PSI). Furthermore, within each data cluster, the individual data points correspond to different data collection events for the given reference fluid at the given temperature and pressure setting.

The similarity between master sensor and node sensors in the specific case of the methane ICE illustrated in FIGS. 5A-5B results in rapid convergence between master sensor and node sensor data in tool parameter space even prior to applying a weighting factor to perform any compensation on the master sensor responses (cf. step 406 in method 400).

FIG. 5C illustrates a chart 500C with a data cross-correlation between the master sensor and the node sensor illustrated in FIG. 5A. Accordingly, the abscissae 553 in chart 500C correspond to the compensated master sensor responses in tool parameter space. The compensated master sensor responses are obtained using a method such as method 400, including step 406. More specifically, data in the abscissae of FIG. 5C may be obtained by performing mathematical operations such as included in Eq. 1 with a suitable weighting factor, C. The ordinates 552 in chart 500C correspond to the node sensor responses in tool parameter space.

Figure 6A:
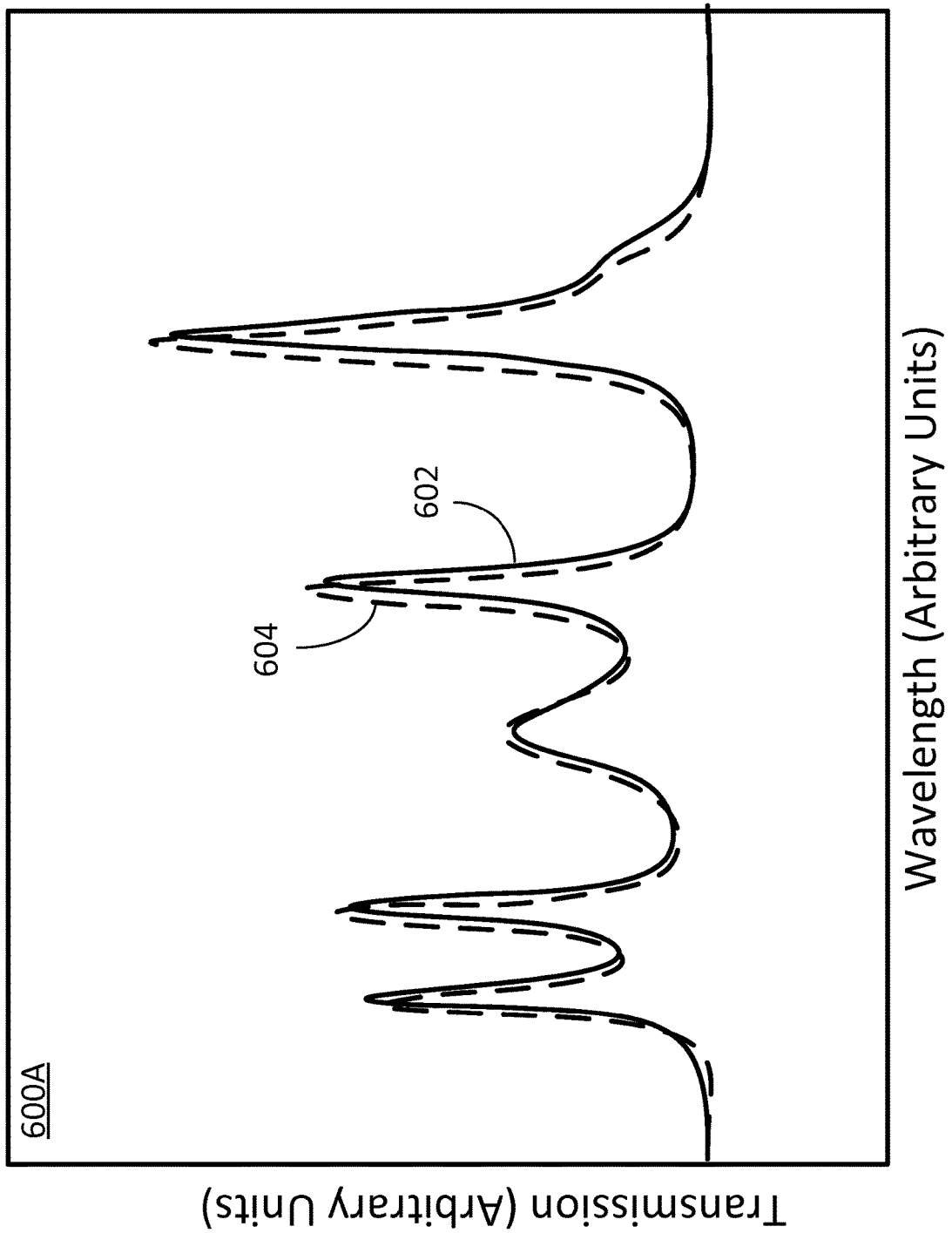
Figure 6B:
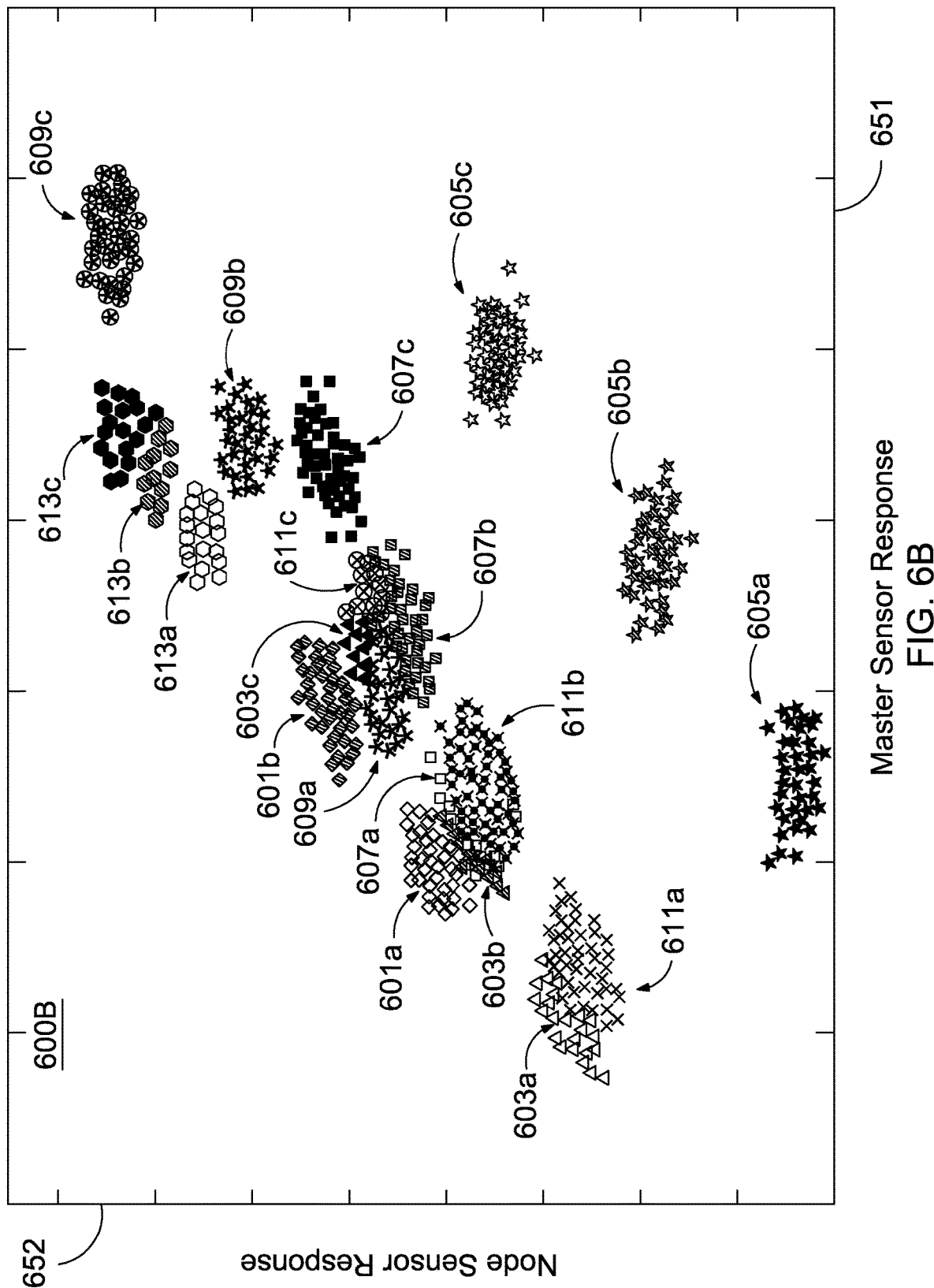

FIGS. 6A-6C illustrate a cross-sensor linearization procedure for a sensor channel including a Gas-Oil-Ratio (GOR) ICE, according to some embodiments. FIGS. 6A-6C illustrate a scenario in which the master sensor and node sensor are among different calibration batches. The sensors are configured in the same way, and the selected ICE cores (GOR ICE in this case) are fabricated with the same design.

FIG. 6A illustrates chart 600A with a master sensor spectral response 602 and a node sensor spectral response 604. Chart 600A includes wavelength in the abscissae and transmission in the ordinates. Spectral responses 602 and 604 may be used in $R_{n,m}$ for the calculation of the sensor response in synthetic parameter space (cf. Eq. (2) above).

FIG. 6B illustrates chart 600B with a data cross-correlation between the master sensor and the node sensor illustrated in FIG. 6A. Accordingly, the abscissae 651 in chart 600B correspond to the master sensor responses in tool parameter space. The ordinates 652 in chart 600B correspond to the node sensor responses in tool parameter space. The multiple data points in chart 600B correspond to a reduced set of reference fluids, and are clustered as detailed above in reference to FIGS. 5A-5C. Accordingly, data clusters 601*a-c* correspond to GOL33; data clusters 603*a-c* correspond to GOL13; data clusters 605*a-c* correspond to H₂O (water); data clusters 607*a-c* correspond to toluene; data clusters 609*a-c* correspond to 1-5 pentanediol (PEN); data clusters 611*a-c* correspond to dodecane (DOD); and data clusters 613*a-c* correspond to N₂ (nitrogen). FIG. 6B Cross-sensor ICE data correlation cannot be modeled with a single linear function without compensation.

FIG. 6C illustrates a chart 600C with a data cross-correlation between the master sensor and the node sensor illustrated in FIG. 6A. Accordingly, the abscissae 653 in chart 600C correspond to the compensated master sensor responses in tool parameter space. The ordinates 652 in chart 600C correspond to the node sensor responses in tool parameter space. In chart 600C, the compensated master sensor response has demonstrated better linear correlation with node sensor response in this scenario, as compared to chart 600B.

Figure 7A:
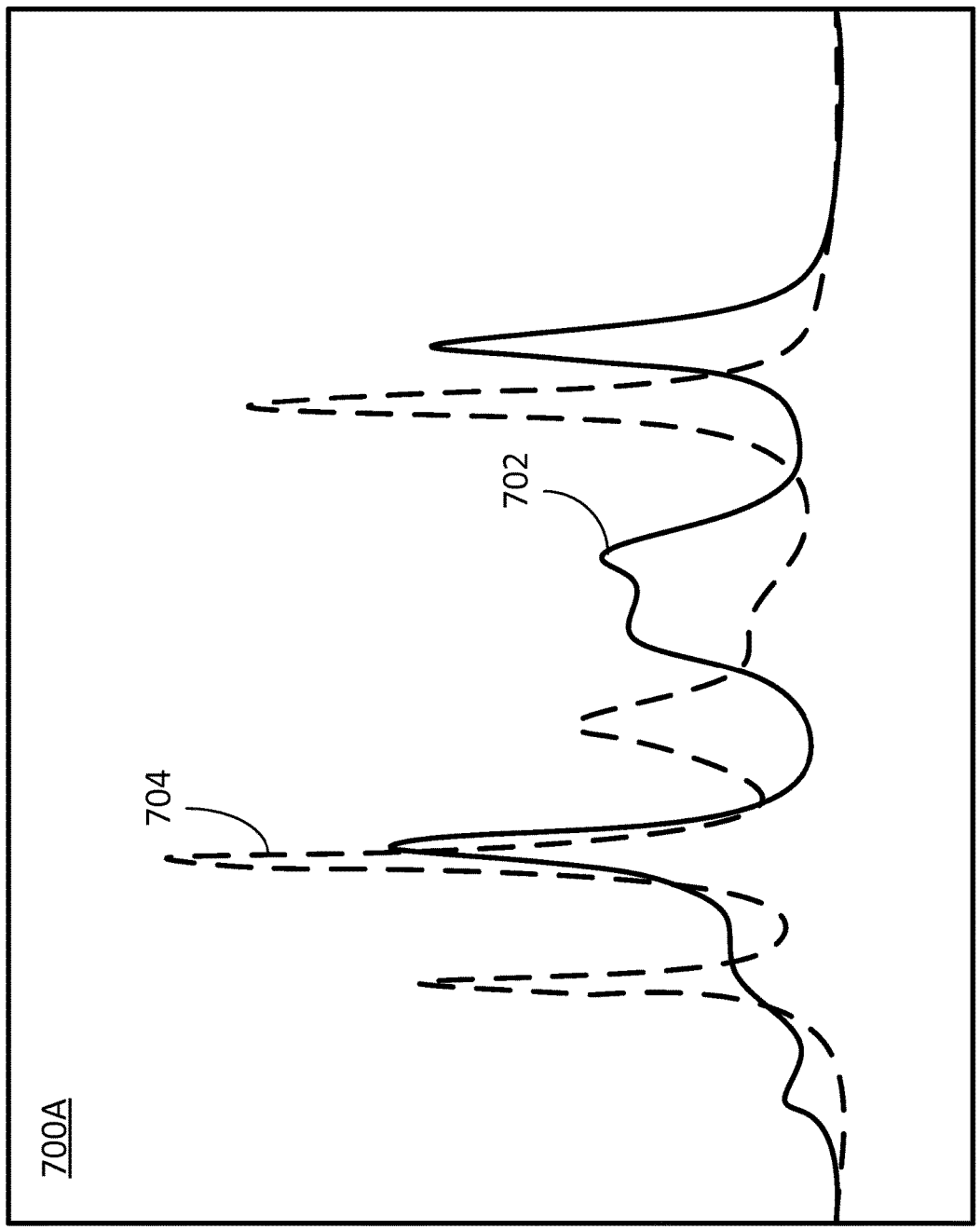
FIGS. 7A-7C illustrate a cross-sensor linearization procedure for a sensor channel including an Aromatics (ARO) ICE.
Figure 7B:
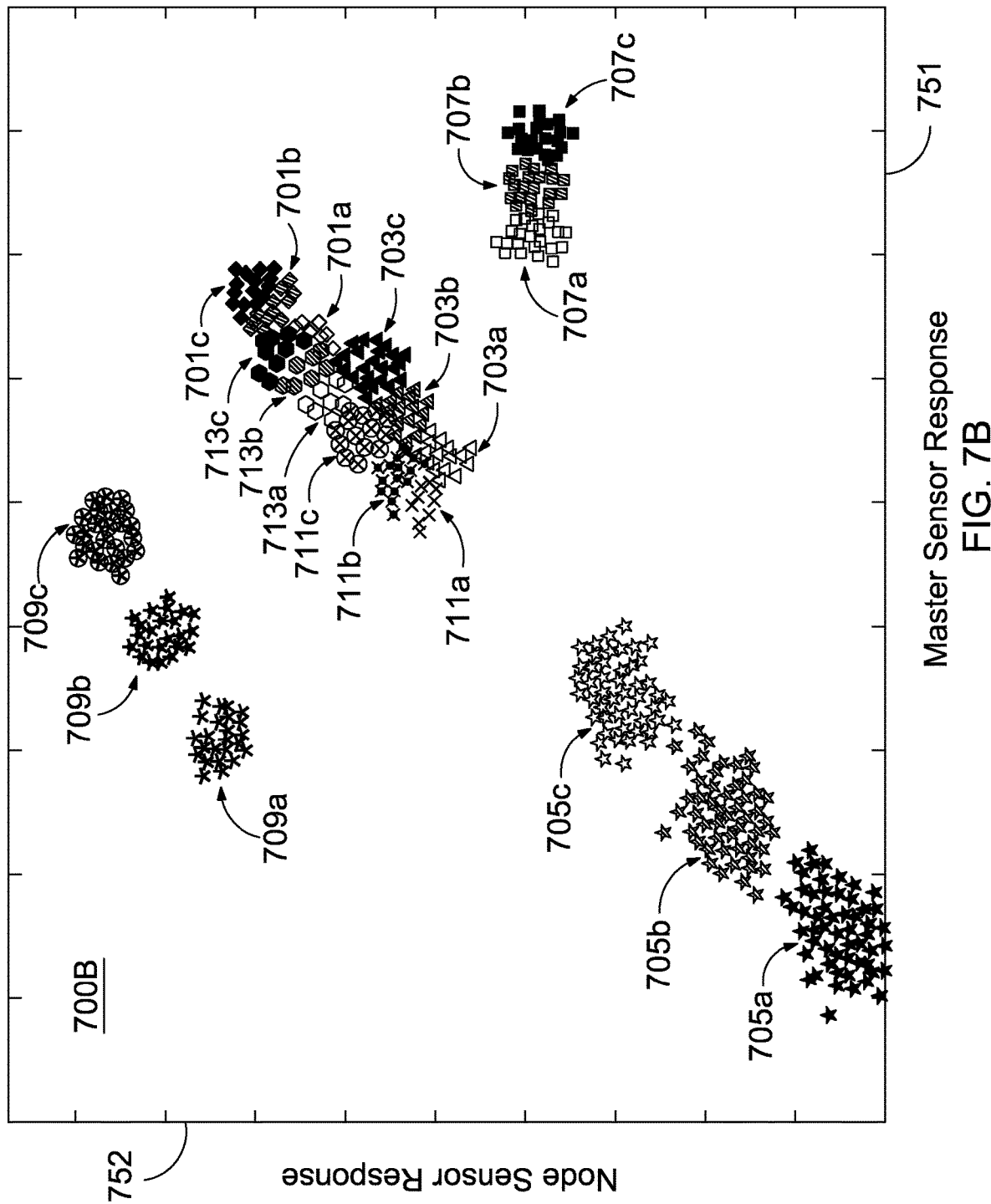
Figure 7C:
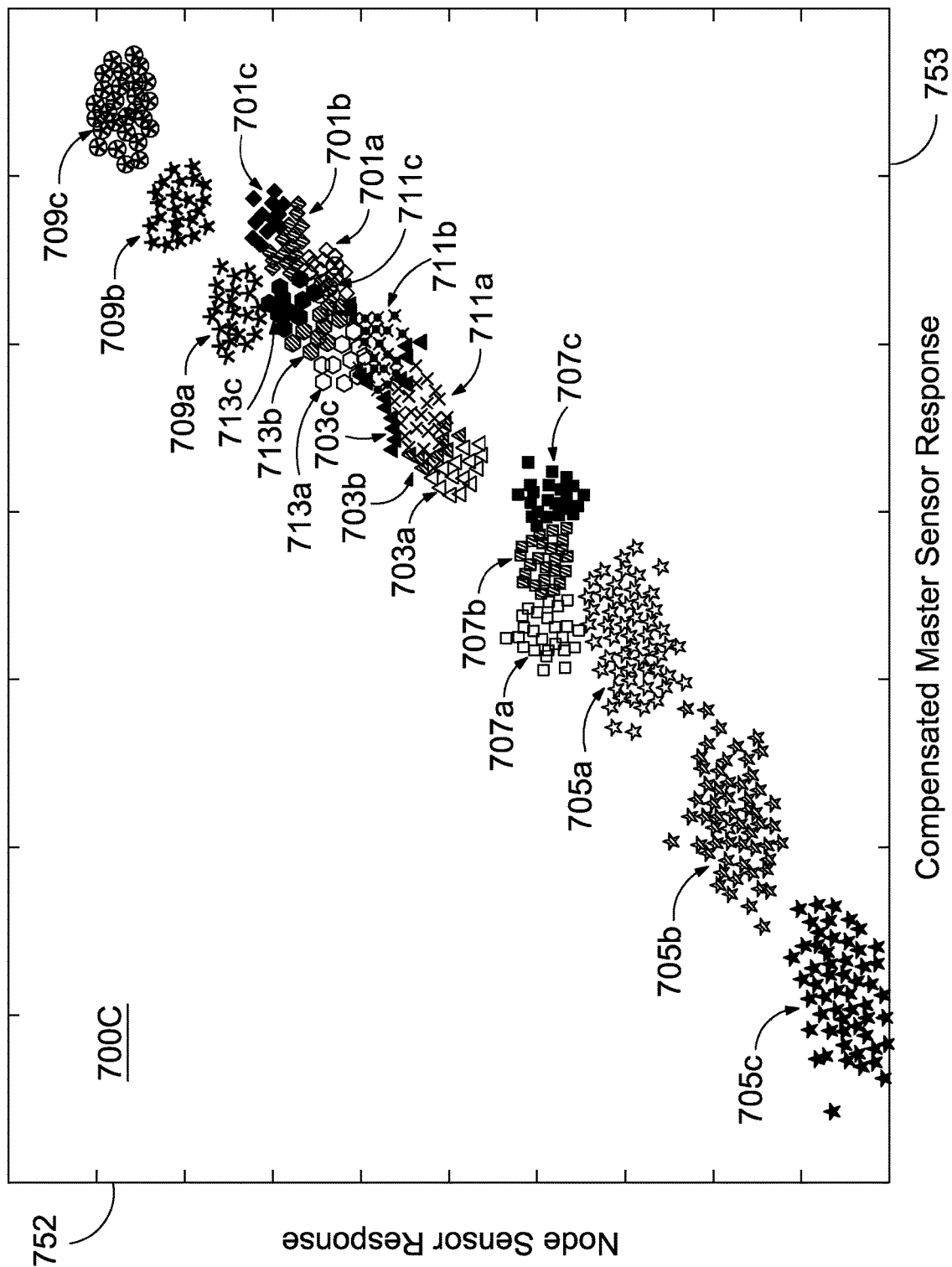

FIGS. 7A-7C illustrate a cross-sensor linearization procedure for a sensor channel including an Aromatics (ARO) ICE, according to some embodiments. FIGS. 7A-7C illustrate a scenario in which the selected ICE elements (e.g., an ICE for measuring aromatics—'aromatics ICE'—in this case) on master sensor and node sensors are not only from different calibration batches, but also from the different designs.

FIG. 7A illustrates chart 700A with a master sensor spectral response 702 and a node sensor spectral response 704. Chart 700A includes wavelength in the abscissae and transmission in the ordinates. Spectral responses 702 and 704 may be used in $R_{n,m}$ for the calculation of the sensor response in synthetic parameter space (cf. Eq. (2) above).

FIG. 7B illustrates chart 700B with a data cross-correlation between the master sensor and the node sensor illustrated in FIG. 7A. Accordingly, the abscissae 751 in chart 700B correspond to the master sensor responses in tool parameter space. The ordinates 752 in chart 700B correspond to the node sensor responses in tool parameter space. The multiple data points in chart 700B correspond to a reduced set of reference fluids, and are clustered as detailed above in reference to FIGS. 5A-5C. Accordingly, data clusters 701*a-c* correspond to GOL33; data clusters 703*a-c* correspond to GOL13; data clusters 705*a-c* correspond to H₂O (water); data clusters 707*a-c* correspond to toluene; data clusters 709*a-c* correspond to 1-5 pentanediol (PEN); data clusters 711*a-c* correspond to dodecane (DOD); and data clusters 713*a-c* correspond to N₂ (nitrogen).

Although sensors have the same number of nominal elements in configuration, the direct data correlation without spectral correction appears to be non-linear again on the given reference fluids. For example, reference fluids associated with data clusters 705*c* and 709*a* have similar master sensor responses 751, but completely different node sensor responses 752. Likewise, reference fluids associated with data clusters 711*a* and 709*c* have similar master sensor responses 751 but different node sensor responses 752. Moreover, reference fluids associated with data clusters 707*a*, 707*b*, and 707*c* have different master sensor responses 751 but similar node sensor responses 752.

FIG. 7C illustrates a chart 700C with a data cross-correlation between the master sensor and the node sensor illustrated in FIG. 7A. Accordingly, the abscissae 753 in chart 700C correspond to the compensated master sensor responses in tool parameter space. The compensated master sensor responses are obtained using a method such as method 400, including step 406. More specifically, data in the abscissae of FIG. 7C may be obtained by performing mathematical operations such as included in Eq. (1) with a suitable weighting factor, C. The ordinates 752 in chart 700C correspond to the node sensor responses in tool parameter space. The significantly improved cross-sensor ICE data linearization is also achieved in this case using the invented method.

Figure 8A:
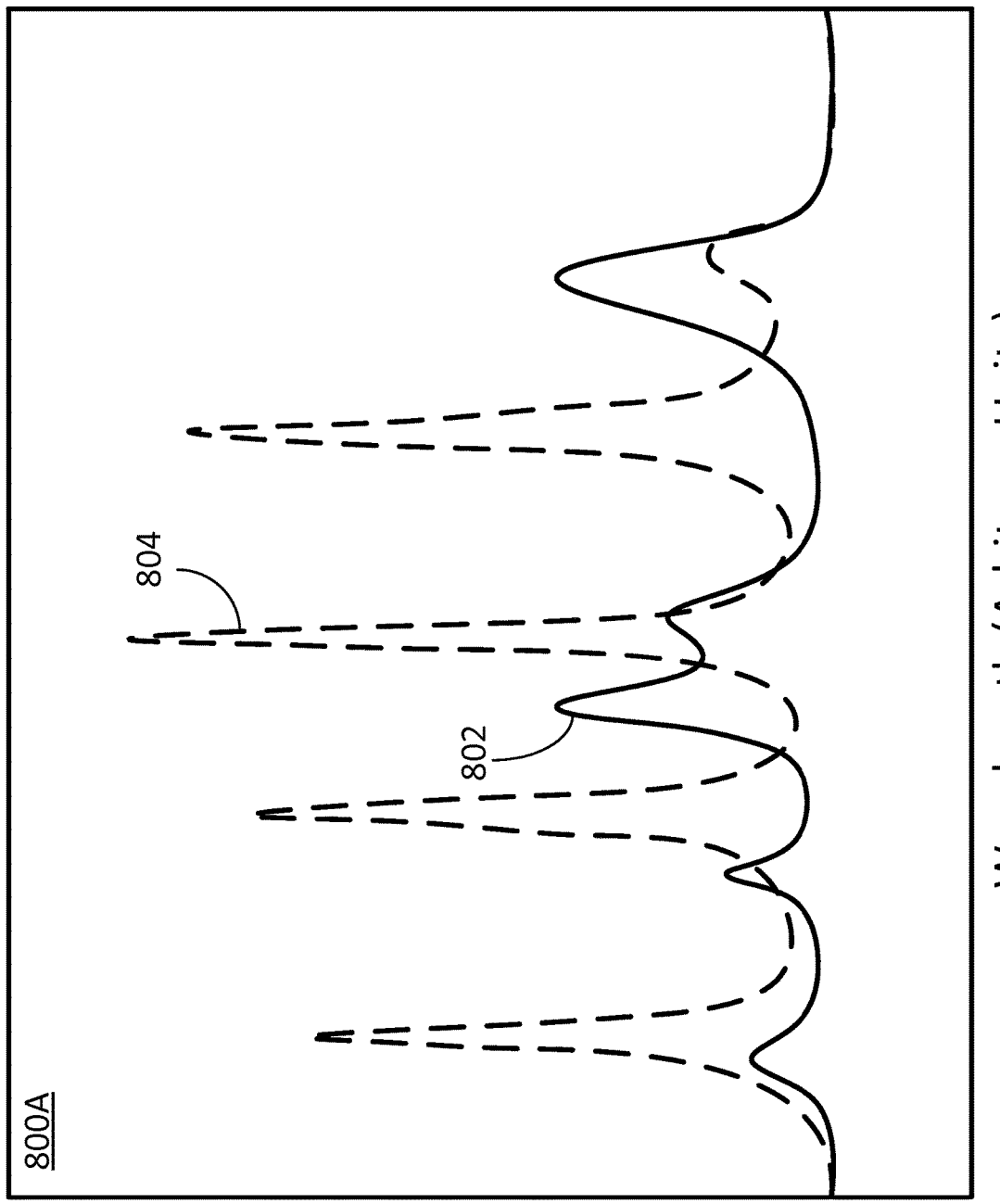
FIGS. 8A-8C illustrate a cross-sensor linearization procedure for a sensor channel including a Saturates (SAT) ICE.
Figure 8B:
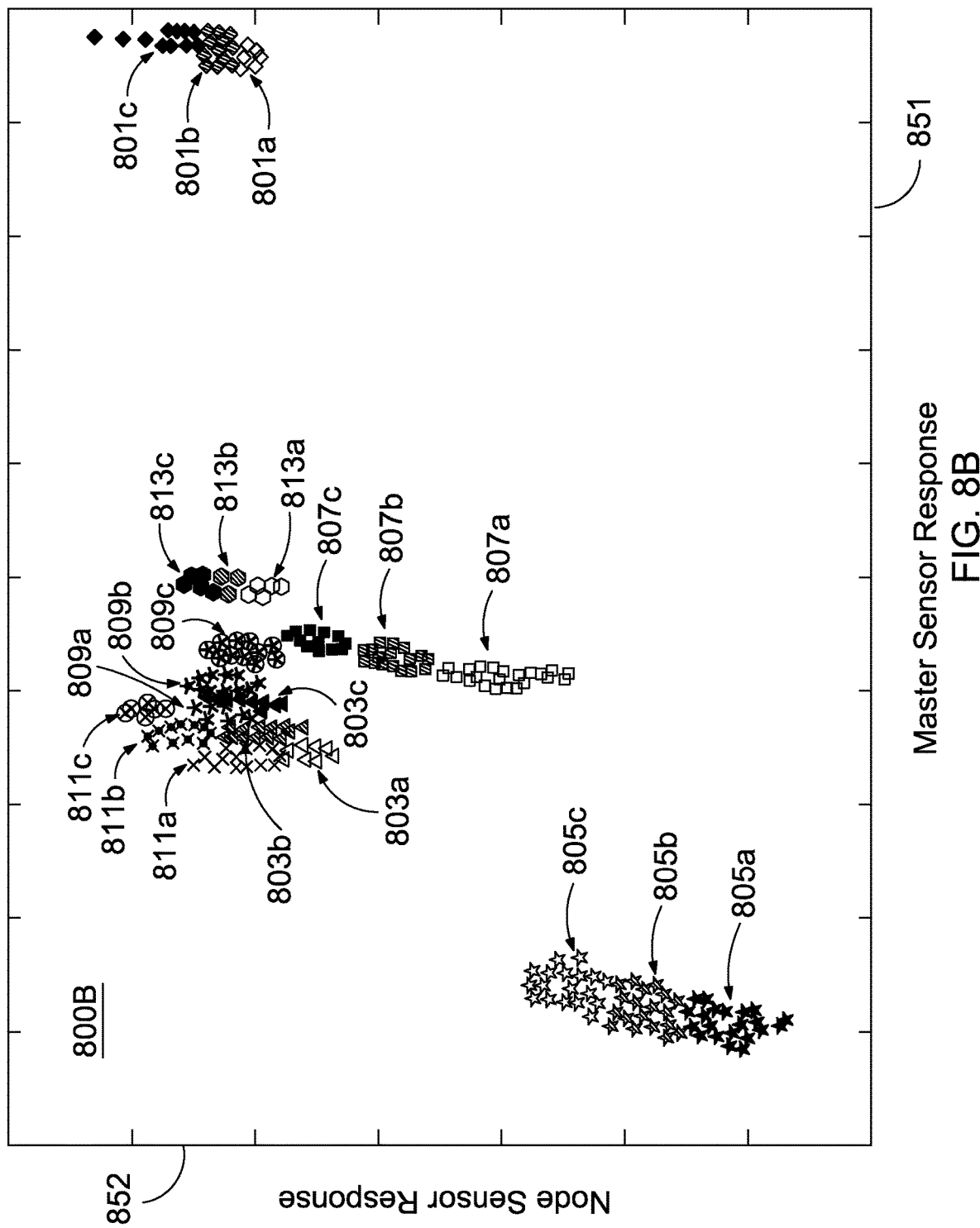
Figure 8C:
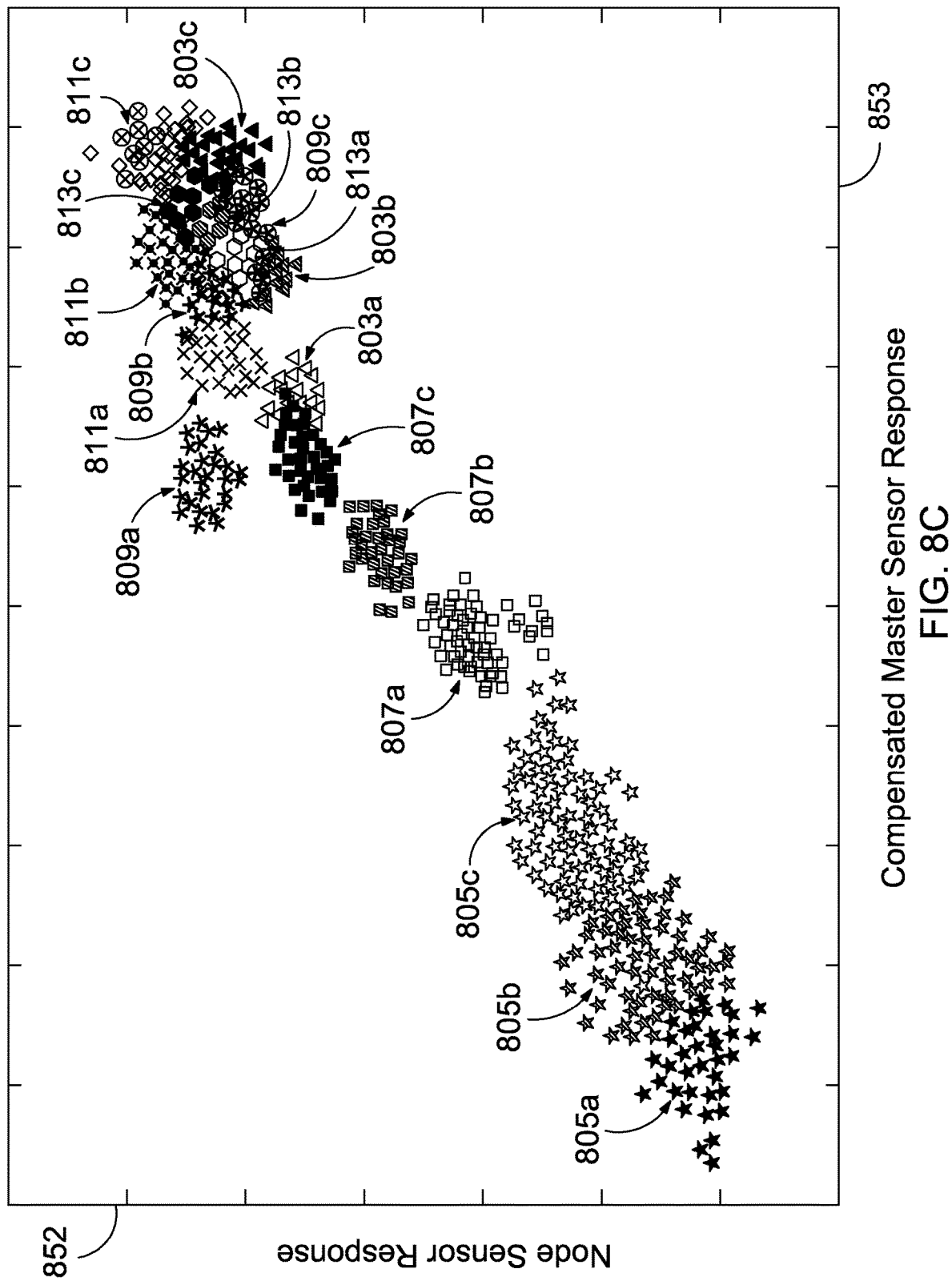

FIGS. 8A-8C illustrate a cross-sensor linearization procedure for a sensor channel including an ICE for measuring saturates, or 'saturates (SAT) ICE', according to some embodiments. FIGS. 8A-8C illustrate a scenario for cross-sensor ICE data linearization wherein the calibration batch, the sensor configuration and the optical element design (SAT ICE in this example) are all different between master and node elements.

FIG. 8A illustrates chart 800A with a master sensor spectral response 802 and a node sensor spectral response 804. Chart 800A includes wavelength in the abscissae and transmission in the ordinates. Spectral responses 802 and 804 may be used in $R_{n,m}$ for the calculation of the sensor response in synthetic parameter space (cf. Eq. (2) above).

FIG. 8B illustrates chart 800B with a data cross-correlation between the master sensor and the node sensor illustrated in FIG. 8A. Accordingly, the abscissae 851 in chart 800B correspond to the master sensor responses in tool parameter space. The ordinates 852 in chart 800B correspond to the node sensor responses in tool parameter space. The multiple data points in chart 800B correspond to a reduced set of reference fluids, and are clustered as detailed above in reference to FIGS. 5A-5C. Data clusters 801*a-c* correspond to GOL33; data clusters 803*a-c* correspond to GOL13; data clusters 805*a-c* correspond to H₂O (water); data clusters 807*a-c* correspond to toluene; data clusters 809*a-c* correspond to 1-5 pentanediol (PEN); data clusters 811*a-c* correspond to dodecane (DOD); and data clusters 813*a-c* correspond to N₂ (nitrogen).

FIG. 8C illustrates a chart 800C with a data cross-correlation between the master sensor and the node sensor illustrated in FIG. 8A. Accordingly, the abscissae 853 in chart 800C correspond to the compensated master sensor responses in tool parameter space. The compensated master sensor responses are obtained using a method such as method 400, including step 406. More specifically, data in the abscissae of FIG. 8C may be obtained by performing mathematical operations such as included in Eq. (1) with a suitable weighting factor, C. The ordinates 852 in chart 800C correspond to the node sensor responses in tool parameter space. FIG. 8C indicates that a reasonably good linear correlation can be generated using linearization methods consistent with the present disclosure. Accordingly, methods as disclosed herein provide a robust approach for standardization of sensor data in tool parameter space for a wide variety of applications.

The linear correlation between compensated master sensor responses and node sensor responses in charts 500C, 600C, 700C, and 800C are expressed mathematically by linear coefficients 'k' and 'b', (cf. Eq. 3). As illustrated, the coefficients 'k' and 'b' and the associated weighting coefficient 'C' in calculating compensated master sensor response (cf. Eq. 1) depend on the optical element and the particular sensor pairs being considered. That is, in some embodiments the coefficients 'k', 'b' and 'C' may differ between chart 500C, chart 600C, chart 700C, and chart 800C (e.g., a methane ICE in FIGS. 5A-5C, an ICE for measuring Gas-to-Oil-Ratio 'GOR ICE' in FIGS. 6A-6C, an aromatics ICE in FIGS. 7A-7C, and a saturates ICE in FIGS. 8A-8C, respectively). For different master-node sensor pairs the coefficients 'k', 'b' and 'C' may also differ even with same nominal design of a methane ICE, or a GOR ICE, or an aromatics ICE, or a saturates ICE.

Figure 9:
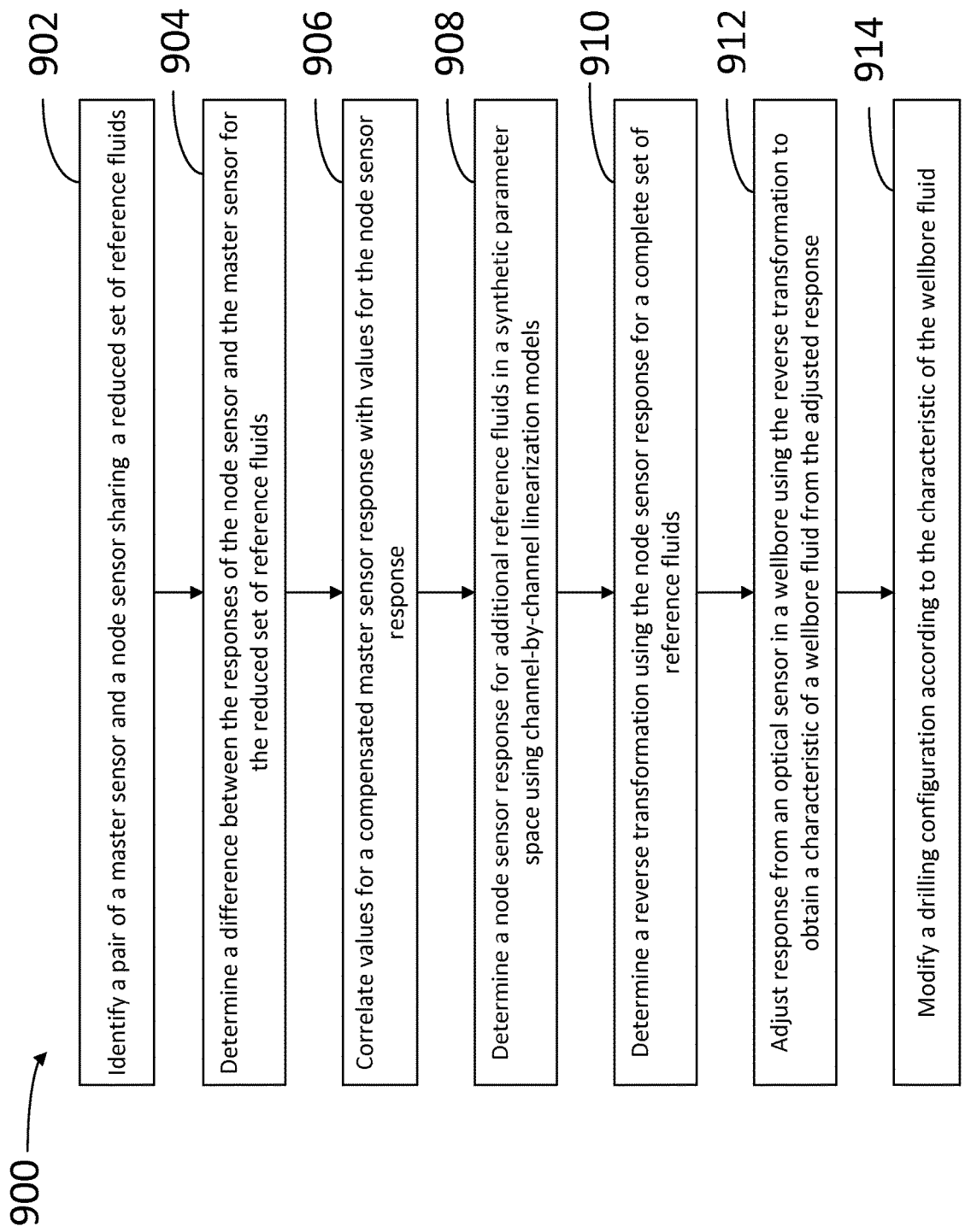
FIG. 9 illustrates a schematic flowchart of a method to be implemented for cross-sensor linearization, and its application for improving reverse transformation and fluid characterization.

FIG. 9 illustrates a schematic flowchart including steps in a method 900 to be implemented for cross-sensor linearization and its application for improving reverse transformation and fluid characterization, according to some embodiments. Method 900 may be performed by a computer device having a memory and a processor (e.g., computer 140, memory 142, and processor 144, cf. FIG. 1). The memory may store commands that, when executed by the processor, cause the computer to perform at least some of the steps in method 900. Methods consistent with method 900 may include at least one but not all of the steps in method 900, performed in any order. Furthermore, methods consistent with the scope of method 900 may include at least some of the steps in method 900 performed overlapping in time, or even simultaneously.

Methods consistent with method 900 may include measuring reference fluids with a measurement system using an optical sensor having a plurality of optical elements (e.g., measurement system 102 and optical elements 104a-n, cf. FIG. 1). In some embodiments, the plurality of optical elements in method 400 may correspond to the same optical sensor, or may belong to different optical sensors. Accordingly, the plurality of optical elements in method 400 may be selected within the same fabrication batch, among the different fabrication batches, within the same optical element design, among different optical element designs, within the same sensor configuration or among different sensor configurations. In some embodiments, the measurement system in method 400 may include a reverse transformation or a forward transformation between sensor responses in a tool parameter space and sensor responses in a synthetic parameter space (e.g., tool parameter space 201, synthetic parameter space 202, reverse transformation 203, and forward transformation 205).

Embodiments consistent with method 900 reduce calibration costs by linearizing cross-sensor correlation. In method 900 and embodiments consistent with the method 900, only a small number of master sensors, which could consist of the selected single or multiple representative sensors from each generation of sensors with same configuration and optical element design, are calibrated on a full-set of reference fluids. The remaining number of node sensors are calibrated on a reduced-set of reference fluids. In some embodiments, the reduced set of reference fluids is a sub-set of the full-set of reference fluids. Method 900 is oriented to obtain a linear mapping, which relates compensated master sensor response for each optical element to a node sensor response in a tool parameter space based on the reduced-set of reference fluids (cf. chart 500C, 600C, 700C, and 800C, above). Further, methods consistent with method 900 include obtaining node sensor responses on additional reference fluids from the linear model just found. Accordingly, methods consistent with method 900 simplify calibration procedures for node sensor by reducing the measurements on reference fluids.

Method 900 describes the procedure to generate node sensor responses in synthetic and tool parameter space on additional reference fluids with channel-by-channel linearization as disclosed herein. Step 902 includes identifying a pair of a master sensor and a node sensor sharing a reduced set of reference fluids. Step 904 includes determining a difference between the responses of the node sensor and the master sensor in the synthetic parameter space for the reduced set of reference fluids to calculate compensated master sensor response in tool parameter space. Step 906 includes correlating values for a compensated master sensor response with values for the measured node sensor response. Step 908 includes determining a node sensor response for additional reference fluids in a tool parameter space using channel-by-channel linearization models with the compensated master sensor response as input.

Step 908 is applied to new data using the models developed on the training data of reduced-set of reference fluids. The additional reference fluids as new data may include live oil sample and methane, the important representatives of petroleum fluids. Since the master sensor has measurements of full-set reference fluids available, and the difference of synthetic node sensor and master sensor response can be calculated in synthetic parameter space, the calculation of pseudo node sensor response is straightforward using the same equations described above (cf. Eqs. 1-3).

Step 910 includes determining a reverse transformation using the node sensor response for a complete set of reference fluids. Step 912 includes adjusting a response from an optical sensor in a wellbore using the reverse transformation to obtain a characteristic of a wellbore fluid from the adjusted response. Step 914 includes modifying operation parameters of drilling or well testing and sampling according to the characteristic of the wellbore fluid.

Figure 10:
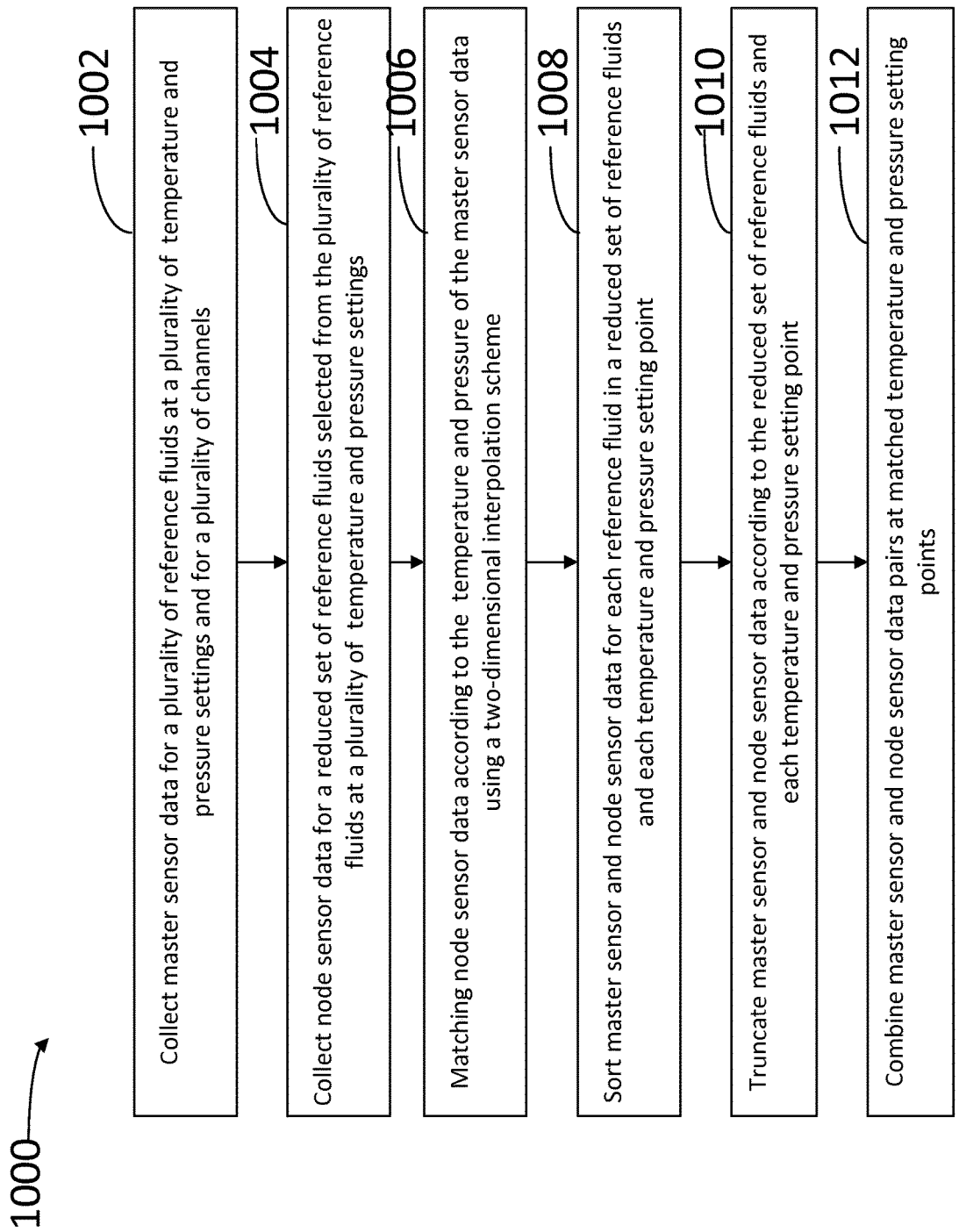
FIG. 10 illustrates a schematic flowchart of a method for cross-sensor linearization with use of a pre-processing procedure to prepare matched data pairs for master sensor and node sensor.

FIG. 10 illustrates a flowchart including steps in a method 1000 as a pre-processing procedure for cross-sensor linearization according to some embodiments, to generate matched data pairs of master and node sensors in tool parameter space. Method 1000 may be performed by a computer device having a memory and a processor (e.g., computer 140, memory 142, and processor 144, cf. FIG. 1). The memory may store commands that, when executed by the processor, cause the computer to perform at least some of the steps in method 1000. Methods consistent with method 1000 may include at least one but not all of the steps in method 1000, performed in any order. Furthermore, methods consistent with the scope of method 1000 may include at least some of the steps in method 1000 performed overlapping in time, or even simultaneously.

Methods consistent with method 1000 may include measuring reference fluids with a measurement system using an optical sensor having a plurality of optical elements (e.g., measurement system 102 and optical elements 104a-n, cf. FIG. 1). In some embodiments, the plurality of optical elements in method 1000 may correspond to the same optical sensor, or may belong to different optical sensors. Accordingly, the plurality of optical elements in method 1000 may be selected within the same fabrication batch, among the different fabrication batches, within the same optical element design, among different optical element designs, within the same sensor configuration or among different sensor configurations. In some embodiments, the measurement system in method 1000 may include a reverse transformation or a forward transformation between sensor responses in a tool parameter space and sensor responses in a synthetic parameter space (e.g., tool parameter space 201, synthetic parameter space 202, reverse transformation 203, and forward transformation 205).

Method 1000 includes matching data pairs from the master sensor and the node sensor to a reduced-set of reference fluids. The reduced-set of reference fluids may include water, nitrogen, one or two typical dead oils, toluene, pentanediol and dodecane, which are safe to take measurements under the specified temperature and pressure settings. Step 1002 includes collecting master sensor data for a plurality of reference fluids at a plurality of temperature and pressure settings and for a plurality of channels. Step 1004 includes collecting node sensor data for the reduced set of reference fluids from the plurality of reference fluids at a plurality of temperature and pressure settings.

Step 1006 includes sorting measured master and node sensor responses on each reference fluid in the reduced set at each stabilized temperature and pressure setting. Step 1008 includes truncating data pairs to the same number of sample points under each condition according to which data size is smaller. Step 1010 includes combining multi-fluid data pairs to form a complete data set.

Figure 11:
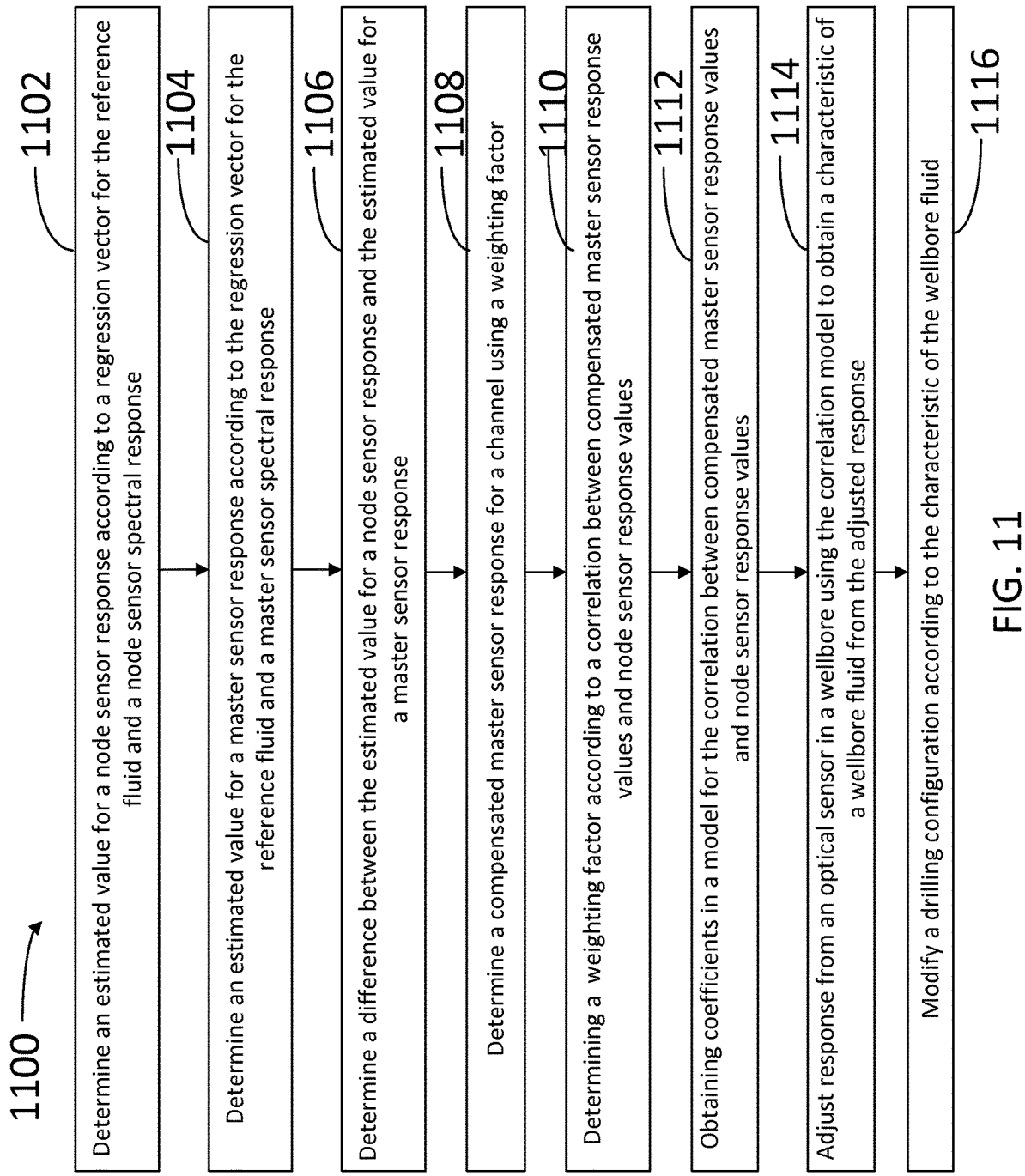
FIG. 11 illustrates a schematic flowchart of a method for cross-sensor linearization with use of a two-dimensional temperature and pressure interpolation scheme for correcting synthetic sensor response and generating optimized model coefficients on the training fluids.

FIG. 11 illustrates a flowchart including steps in a method 1100 for cross-sensor linearization with use of a two-dimensional temperature and pressure interpolation scheme for correcting synthetic sensor response and generating optimized model coefficients on the training fluids, according to some embodiments. Method 1100 may be performed by a computer device having a memory and a processor (e.g., computer 140, memory 142, and processor 144, cf. FIG. 1). The memory may store commands that, when executed by the processor, cause the computer to perform at least some of the steps in method 1100. Methods consistent with method 1100 may include at least one but not all of the steps in method 1100, performed in any order. Furthermore, methods consistent with the scope of method 1100 may include at least some of the steps in method 1100 performed overlapping in time, or even simultaneously.

Methods consistent with method 1100 may include measuring reference fluids with a measurement system using an optical sensor having a plurality of optical elements (e.g., measurement system 102 and optical elements 104a-n, cf. FIG. 1). In some embodiments, the plurality of optical elements in method 1100 may correspond to the same optical sensor, or may belong to different optical sensors. Accordingly, the plurality of optical elements in method 1100 may be selected within the same fabrication batch, among the different fabrication batches, within the same optical element design, among different optical element designs, within the same sensor configuration or among different sensor configurations. In some embodiments, the measurement system in method 1100 may include a reverse transformation or a forward transformation between sensor responses in a tool parameter space and sensor responses in a synthetic parameter space (e.g., tool parameter space 201, synthetic parameter space 202, reverse transformation 203, and forward transformation 205).

The flowchart in FIG. 11 starts with steps to calculate the difference between node and master sensor responses in synthetic parameter space ($S_n$ and $S_m$ in Eq. (1)) on the reduced-set of reference fluids (steps 1102 to 1106) using Eq. (2) and two-dimensional interpolation. Synthetic sensor responses obtained with Eq. (2) are representatives of 'ideal' data points with fluid spectroscopy data averaged over a large number of measurements around each specified temperature and pressure combination setting. After the responses of each optical element at 12 combination setting points (3 temperatures and 4 pressures) are calculated for each reference fluid, the data relationship between the synthetic optical responses and the ideal temperatures and pressures can be organized in the format of 3 by 4 matrices as the given points for two-dimensional interpolation in simulating the synthetic response of the same optical element with other within-range temperatures and pressures as inputs.

Step 1102 includes determining an estimated value for a node sensor response on each fluid at ideal setting points in synthetic parameter space from Eq. (2), and using two-dimensional interpolation with actually measured temperature and pressure in tool parameter space as inputs to correct signal variation. Step 1102 corrects the drift of synthetic signals of node sensor in response to slight variations in temperature and pressure settings from ideal setting values during measurement. Step 1104 includes determining an estimated value for a master sensor response under the same conditions of Step 1102 in synthetic parameter space from Eq. (2), and using two-dimensional temperature and pressure interpolation to correct signal drift due to variation in actual temperature and pressure measurements which may endure slight change around the ideal setting values. Step 1106 includes determining a difference between the estimated values for a node sensor response and the estimated value for a master sensor response. Step 1108 includes determining a set of cross-sensor linearized model coefficients (e.g., 'C', 'k', and 'b' in Eq. (1) and Eq. (3)) in an optimization loop. In some embodiments, step 1108 includes selecting the set of coefficients 'C', 'k' and 'b' that result in the best linear fit (cf. Eq. (3)). Step 1108 includes determining a set of cross-sensor linearized model coefficients in an exhaustive searching or optimization loop through multi-iteration training.

When the master sensor and the node sensor have different configuration or element design, a particular element response of the node sensor may be simulated with a different nominal element response of the master sensor (i.e., a Methane ICE response of the node sensor may be better simulated with a GOR ICE response of the master sensor). Step 1110 includes adjusting master sensor channel selection to simulate a particular channel response of the node sensor with different element design, and re-calculating the compensated master sensor response and re-determining a set of coefficients of 'C', 'k', and 'b'. Accordingly, step 1110 may include adjusting the master sensor response from a master sensor channel to simulate a node sensor response from a node sensor channel wherein the master sensor channel may be the same, or different, than the node sensor channel. In general, the choice of master-sensor channel and node sensor channel pairs to be correlated (e.g. abscissae and ordinates in FIGS. 5B,C, FIGS. 6B,C, FIGS. 7B,C, and FIGS. 8B,C) is based on which channel correlation results in the best, or better, linear correlation between the data from the two sensor channels (i.e., the master sensor channel and the node sensor channel). Accordingly, method 1100 may further include adjusting a master sensor channel selection from a master sensor to simulate a node sensor channel response from a node sensor wherein the master sensor channel has the same or different nominal element as the node sensor channel.

Step 1112 includes storing at least one set of cross-sensor linearized model coefficients for at least one node sensor channel. Step 1112 saves the best set of cross-sensor linearized model coefficients for each node sensor channel based on the reduced set of reference fluids and applies them to simulate the node sensor responses of additional reference fluids to be described in FIG. 12.

Figure 12:
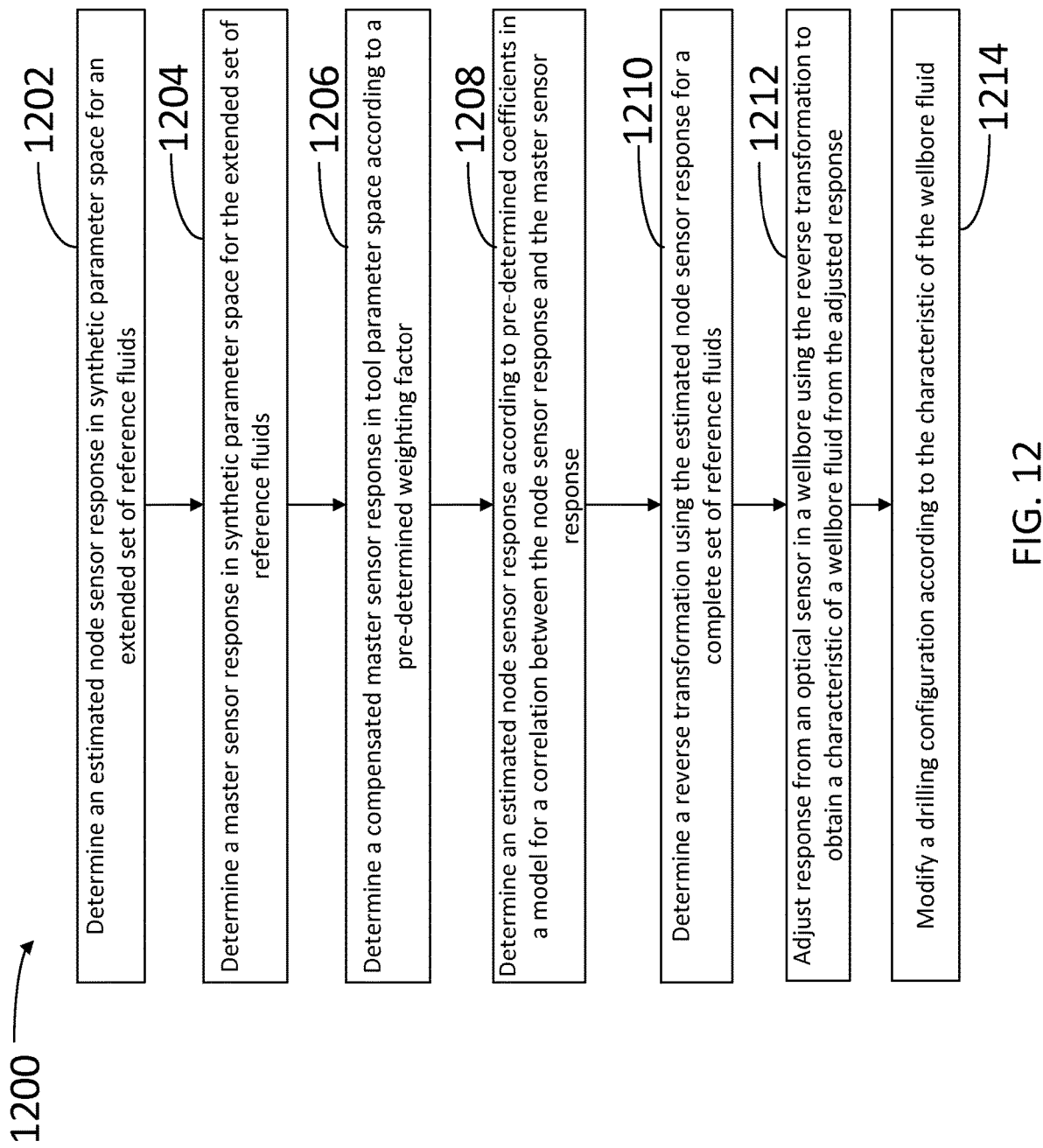
FIG. 12 illustrates a schematic flowchart of a method for cross-sensor linearization by estimating and including a node sensor response for an extended set of reference fluids for robust reverse transformation.

FIG. 12 illustrates a flowchart including steps in a method 1200 for cross-sensor linearization by estimating and including a node sensor response for an additional set of reference fluids for robust reverse transformation, according to some embodiments. Method 1200 may be performed by a computer device having a memory and a processor (e.g., computer 140, memory 142, and processor 144, cf. FIG. 1). The memory may store commands that, when executed by the processor, cause the computer to perform at least some of the steps in method 1200. Methods consistent with method 1200 may include at least one but not all of the steps in method 1200, performed in any order. Furthermore, methods consistent with the scope of method 1200 may include at least some of the steps in method 1200 performed overlapping in time, or even simultaneously.

Methods consistent with method 1200 may include measuring reference fluids with a measurement system using an optical sensor having a plurality of optical elements (e.g., measurement system 102 and optical elements 104*a-n*, cf. FIG. 1). In some embodiments, the plurality of optical elements in method 1200 may correspond to the same optical sensor, or may belong to different optical sensors. Accordingly, the plurality of optical elements in method 1200 may be selected within the same fabrication batch, among different fabrication batches, within the same optical element design, among different optical element designs, within the same sensor configuration or among different sensor configurations. In some embodiments, the measurement system in method 1200 may include a reverse transformation or a forward transformation between sensor responses in a tool parameter space and sensor responses in a synthetic parameter space (e.g., tool parameter space 201, synthetic parameter space 202, reverse transformation 203, and forward transformation 205).

Step 1202 includes determining an estimated node sensor response in synthetic parameter space for an extended set of reference fluids with use of Eq. (2) and two-dimensional temperature and pressure interpolation. Step 1204 includes determining a master sensor response in synthetic parameter space for an extended set of reference fluids. Step 1206 includes determining a compensated master sensor response in tool parameter space according to a predetermined weighting factor. At step 1206, the compensated master sensor response on the additional set of reference fluids is calculated in Eq. (1) with use of each pre-determined weighting factor value, C, channel by channel. Step 1208 includes determining an estimated node sensor response through Eq. (3) with use of each set of pre-determined coefficients 'k' and 'b' channel by channel. Step 1210 includes determining a reverse transformation using the estimated node sensor response in tool parameter space for a complete set of reference fluids as training inputs. In some embodiments, step 1210 includes determining node sensor responses in synthetic parameter for the same set of reference fluids as training outputs. Step 1212 includes adjusting a response from an optical sensor in a wellbore using the reverse transformation to obtain a characteristic of a wellbore fluid from the adjusted response. Step 1214 includes modifying operation parameters of drilling or well testing and sampling according to the characteristic of the wellbore fluid.

Figure 13:
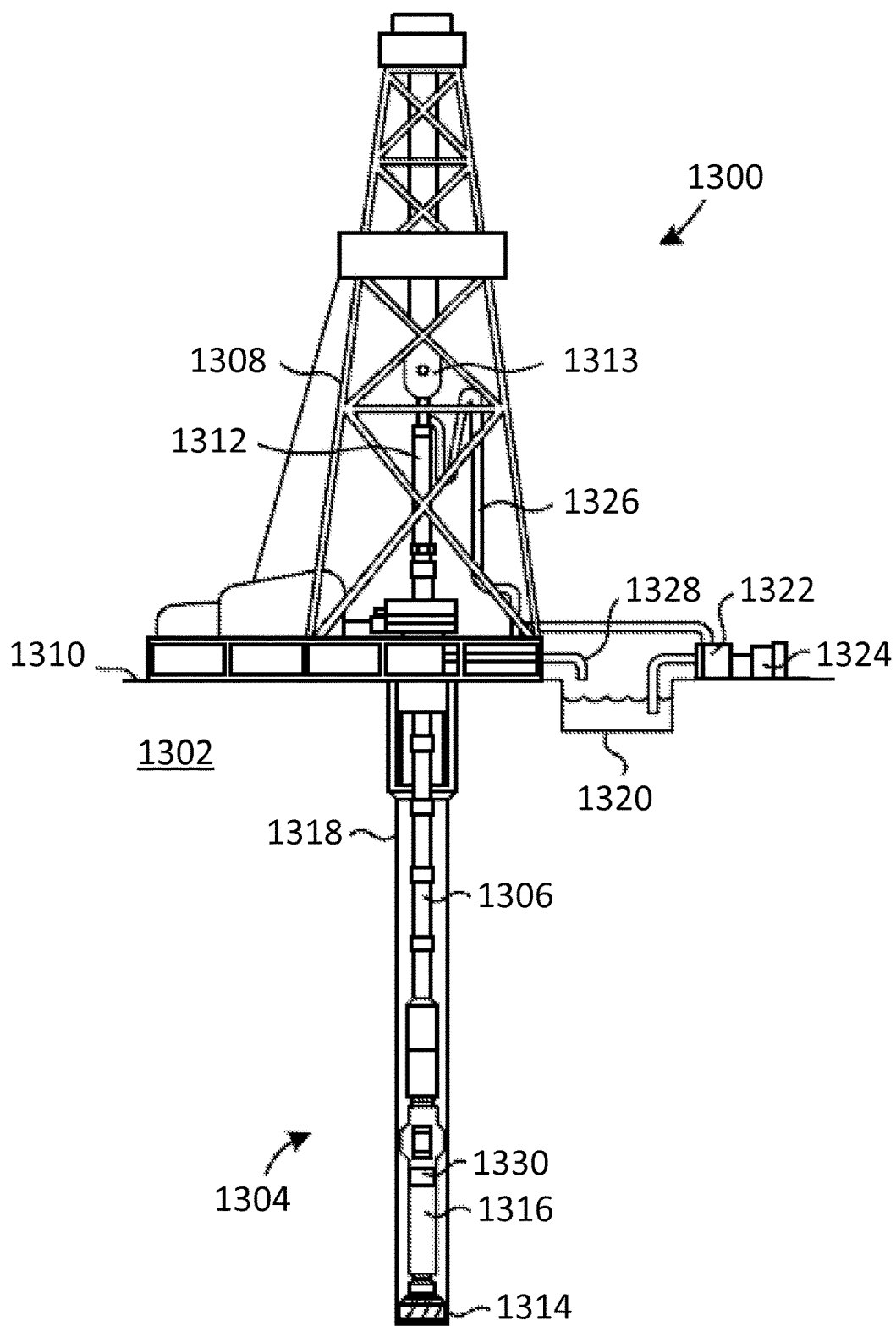
FIG. 13 is a drilling system configured to use a calibrated optical sensor for modifying a drilling parameter or configuration in a measurement-while-drilling (MWD) and a logging-while-drilling (LWD) operations.

FIG. 13 is a drilling system 1300 configured to use a calibrated optical sensor for modifying a drilling parameter or configuration in a measurement-while-drilling (MWD) and a logging-while-drilling (LWD) operation, according to some embodiments. Boreholes may be created by drilling into the earth 1302 using the drilling system 1300. The drilling system 1300 may be configured to drive a bottom hole assembly (BHA) 1304 positioned or otherwise arranged at the bottom of a drill string 1306 extended into the earth 1302 from a derrick 1308 arranged at the surface 1310. The derrick 1308 includes a Kelly 1312 and a traveling block 1313 used to lower and raise the Kelly 1312 and the drill string 1306.

The BHA 1304 may include a drill bit 1314 operatively coupled to a tool string 1316 which may be moved axially within a drilled wellbore 1318 as attached to the drill string 1306. During operation, the drill bit 1414 penetrates the earth 1302 and thereby creates the wellbore 1318. The BHA 1404 provides directional control of the drill bit 1314 as it advances into the earth 1302. The tool string 1316 can be semi-permanently mounted with various measurement tools (not shown) such as, but not limited to, measurement-while-drilling (MWD) and logging-while-drilling (LWD) tools, that may be configured to take downhole measurements of drilling conditions. In other embodiments, the measurement tools may be self-contained within the tool string 1316, as shown in FIG. 13.

Fluid or "mud" from a mud tank 1320 may be pumped downhole using a mud pump 1322 powered by an adjacent power source, such as a prime mover or motor 1324. The mud may be pumped from the mud tank 1320, through a stand pipe 1326, which feeds the mud into the drill string 1306 and conveys the same to the drill bit 1314. The mud exits one or more nozzles arranged in the drill bit 1314 and in the process cools the drill bit 1314. After exiting the drill bit 1314, the mud circulates back to the surface 1310 via the annulus defined between the wellbore 1318 and the drill string 1306, and in the process returns drill cuttings and debris to the surface. The cuttings and mud mixture are passed through a flow line 1328 and are processed such that a cleaned mud is returned down hole through the stand pipe 1326 once again.

The BHA 1304 may further include a downhole tool 1330 that may be similar to the downhole tools described herein. More particularly, the downhole tool 1330 may have a calibrated optical sensor arranged therein, and the downhole tool 1330 may have been calibrated prior to being introduced into the wellbore 1318 using the tool validation testing generally described herein. Moreover, prior to being introduced into the wellbore 1318, the downhole tool 1330 may have been optimized by generally following method 400 of FIG. 4. In some embodiments, downhole tool 1330 is configured to perform at least one of the steps described above in any one of methods 900, 1000, 1100, and 1200.

Figure 14:
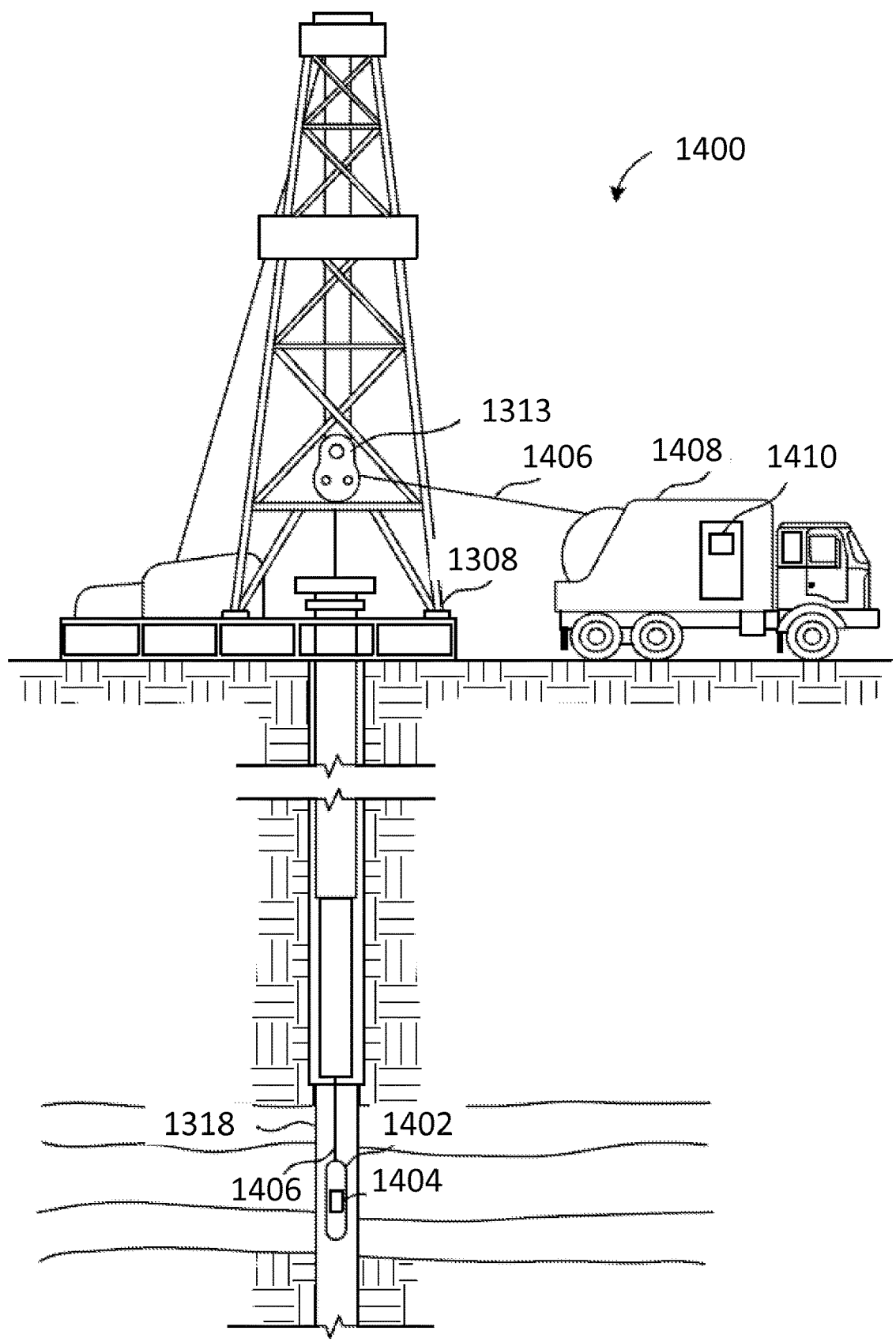
FIG. 14 is a wireline system configured to use a calibrated optical sensor during formation testing and sampling.

FIG. 14, illustrates a wireline system 1400 that may employ one or more principles of the present disclosure. In some embodiments, wireline system 1400 may be configured to use a calibrates optical sensor during formation testing and sampling. After drilling of wellbore 1318 is complete, it may be desirable to know more details of types of formation fluids and the associated characteristics through sampling with use of wireline formation tester. System 1400 may include a downhole tool 1402 that forms part of a wireline logging operation that can include one or more optical sensors 1404, as described herein, as part of a downhole measurement tool. System 1400 may include the derrick 1308 that supports the traveling block 1313. Wireline logging tool 1402, such as a probe or sonde, may be lowered by wireline or logging cable 1406 into the borehole 1318. Tool 1402 may be lowered to the bottom of the region of interest and subsequently pulled upward at a substantially constant speed. Tool 1402 may be configured to measure fluid properties of the wellbore fluids, and any measurement data generated by downhole tool 1402 and its associated optical sensors 1404 can be communicated to a surface logging facility 1408 for storage, processing, and/or analysis. Logging facility 1408 may be provided with electronic equipment 1410, including processors for various types of signal processing. In some embodiments, downhole tool 1402 and logging facility 1408 are configured to perform at least one of the steps described above in any one of methods 400, 900, 1000, 1100, and 1200.

Embodiments disclosed herein include:

A. A method that includes obtaining a plurality of master sensor responses with a master sensor in a set of training fluids, obtaining a plurality of node sensor responses with a plurality of node sensors in the set of training fluids, finding a linear correlation between a compensated master data set and a node data set for the set of training fluids, generating a plurality of node sensor responses in a tool parameter space from the compensated master data set on a set of application fluids, obtaining a reverse transformation based on the plurality of node sensor responses in a complete set of calibration fluids, the reverse transformation transforming each node sensor response from a tool parameter space to a synthetic parameter space, obtaining fluid characteristics with synthetic fluid predictive models using reverse-transformed inputs from at least one of the node sensor responses to a fluid measurement, and modifying operation parameters of a drilling or a well testing and sampling system according to the fluid characteristics, wherein the complete set of calibration fluids comprises the set of training fluids and the set of application fluids.

B. A method that includes determining an value for a node sensor response in synthetic parameter space using a two-dimensional temperature and pressure interpolation with given node sensor responses at specified temperatures and pressures, determining an value for a master sensor response in synthetic parameter space using the two-dimensional temperature and pressure interpolation with given master sensor response at specified temperatures and pressures, determining a difference between the value for a node sensor response and the value for a master sensor response, determining a set of cross-sensor linearized model coefficients in an optimization loop, adjusting a master sensor channel selection to simulate a channel response of the node sensor, obtaining a reverse transformation using the simulated channel responses of the node sensor, and modifying operation parameters of a drilling or a well testing and sampling system according to a fluid characteristic obtained with a synthetic fluid predictive model using node sensor responses as input to the reverse transformation.

C. A method that includes introducing a tool into a wellbore drilled into one or more subterranean formations, the tool having been previously calibrated for operation by obtaining a plurality of master sensor responses with a master sensor in a set of training fluids, obtaining a plurality of node sensor responses with a plurality of node sensors in the set of training fluids, each of the plurality of node sensors and the master sensor including an optical element, finding a linear correlation between a compensated master data set and a node data set for the set of training fluids, generating a plurality of node sensor responses in a tool parameter space from the compensated master data set on a set of application fluids, and obtaining a reverse transformation based on the plurality of node sensor responses in a complete set of calibration fluids, wherein the complete set of calibration fluids comprises the set of training fluids and the set of application fluids, determining a fluid characteristic from the plurality of node sensor responses in the synthetic parameter space using the reverse transformation and a synthetic fluid predictive model, and modifying operation parameters of a drilling or a well testing and sampling according to the fluid characteristic.

Each of embodiments A, B, and C may have one or more of the following additional elements in any combination: Element 1: further comprising selecting a weighting factor to compensate the master sensor responses with the node sensor responses according to the linear correlation between the compensated master data set and the node data set. Element 2: wherein selecting the weighting factor comprises selecting a weighting factor that results in a high linear correlation between the compensated master data set and the node data set, wherein the high linear correlation indicates a low data transformation error. Element 3: wherein selecting the weighting factor comprises determining a set of cross-sensor linearized coefficients comprising the weighting factor for each channel pair, using an exhaustive searching loop through multi-iteration training. Element 4: further comprising selecting the master sensor and at least one of the plurality of node sensors from two sensors having a same design, two sensors having a same configuration, and two sensors from a fabrication batch. Element 5: further comprising selecting the master sensor and at least one of the plurality of node sensors from different fabrication batches, and from two sensors having a same design and having a same configuration. Element 6: further comprising selecting the master sensor and at least one of the plurality of node sensors from different fabrication batches having a different design, and with a same number of elements having the same denomination. Element 7: further comprising selecting the master sensor and at least one of the plurality of node sensors from different designs, from different configurations, and originating from different fabrication batches. Element 8: further comprising truncating a master data set to a same number of samples as a node data set, wherein each sample in the master data set comprises a measurement having a temperature setting and pressure setting similar to a temperature setting and a pressure setting of at least one measurement in the node data set. Element 9: wherein finding a linear correlation between a compensated master data and the node data set comprises applying a weight factor to a difference between a synthetic node sensor response and a synthetic master sensor response for a reference fluid selected from the set of training fluids, and adding the weighted difference to a master sensor response measured from the reference fluid. Element 10: further comprising determining at least one of a node sensor response and a master sensor response in the synthetic parameter space with a dot product of a fluid spectral response vector and a convolved spectral response vector for one of the at least one node sensor or the master sensor. Element 11: further comprising obtaining fluid characteristics with a synthetic fluid predictive model using the reverse transformed inputs from at least one of the node sensor responses to a fluid measurement. Element 12: wherein obtaining a plurality of node sensor responses with a plurality of node sensors on the set of training fluids comprises measured and simulated node sensor responses from reference fluids at broad ranges of temperature settings and pressure settings. Element 13: further comprising collecting optical responses from a plurality of petroleum fluids with known characteristics using the selected master sensor, generating a plurality of synthetic node sensor responses associated with the plurality of petroleum fluids using the reverse transformation with cross-sensor linearized node sensor inputs in tool parameter space, and calibrating a fluid characterization model using the plurality of synthetic node sensor responses.

Element 14: wherein determining the value for a node sensor response and determining the value for a master sensor response comprises varying temperature and pressure conditions for a plurality of node sensor responses and master sensor responses. Element 16: wherein adjusting the master sensor channel selection to simulate a channel response of the node sensor comprises identifying a set of cross-sensor linearized coefficients for a node sensor channel based on a plurality of training fluids, and obtaining the channel response of the node sensor on a plurality of application fluids with the set of cross-sensor linearized model coefficients. Element 17: wherein obtaining a reverse transformation using the simulated channel responses of the node sensor comprises combining the node sensor response on a plurality of training fluids and a plurality of application fluids to develop the reverse transformation model with a neural network. Element 18: further comprising adjusting a master sensor channel selection from a master sensor to simulate a node sensor channel response from a node sensor. Element 19: wherein the master sensor channel has the same or different nominal element as the node sensor channel.

Element 20: wherein obtaining a plurality of node sensor responses with a plurality of node sensors in the set of training fluids during the tool calibration comprises determining a temperature setting and a pressure setting of the reduced set of training fluids according to a temperature setting and a pressure setting of the master set of training fluids. Element 21: further comprising, during the tool calibration, selecting one of the plurality of master sensors and one of the plurality of node sensors from two sensors having at least one of different designs, different configurations, or different fabrication batches.

By way of non-limiting example, exemplary combinations applicable to A, B, and C include: Element 1 with Element 2; Element 1 with Element 2; and Element 18 with Element 19.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A method comprising:
   calibrating a downhole tool having a master sensor and a plurality of node sensors, the calibrating comprising:
      obtaining a plurality of master sensor responses from the master sensor for a set of training fluids,
      obtaining a first plurality of node sensor responses from the plurality of node sensors for the set of training fluids,
      determining a linear correlation between a compensated master sensor data set comprising a plurality of compensated master sensor responses for the set of training fluids and a node sensor data set comprising the first plurality of node sensor responses,
      generating a second plurality of node sensor responses in a tool parameter space from the compensated master data set for a set of application fluids,
      obtaining a reverse transformation model based on a third plurality of node sensor responses for a set of calibration fluids that comprises the set of training fluids and the set of application fluids, and
   applying the reverse transformation model to node sensor responses, wherein said applying the reverse transformation transforms each node sensor response from the tool parameter space to a synthetic parameter space.

2. The method of claim 1, wherein at least one of the plurality of node sensors comprises an integrated computational element configured to optically interact with a wellbore fluid to provide a signal indicative of one or more fluid properties, the method further comprising optically interacting the integrated computational element with the wellbore fluid and using the signal in the reverse transformation to obtain a fluid measurement.

3. The method of claim 1, wherein at least one of the plurality of node sensors comprises an integrated computational element configured to optically interact with a wellbore fluid, the method further comprising finding at least one of a methane concentration, a gas-oil-ratio, an aromatics concentration or a saturates concentration in the wellbore fluid from a parameter in the synthetic parameter space, the parameter associated with a response from the integrated computational element.

4. The method of claim 1, wherein at least one of the plurality of node sensors comprises an integrated computational element configured to optically interact with a wellbore fluid to provide an optical response, the method further comprising including a value from the synthetic parameter space in an optical fluid model to obtain the fluid measurement, the value associated with the optical response.

5. The method of claim 1, further comprising:
   selecting a weighting factor to compensate the plurality of master sensor responses with the first plurality of node sensor responses according to the linear correlation between the compensated master sensor data set and the node sensor data set.

6. The method of claim 5, wherein selecting the weighting factor comprises selecting a weighting factor that results in a high linear correlation between the compensated master sensor data set and the node sensor data set, wherein the high linear correlation indicates a low data transformation error.

7. The method of claim 5, wherein selecting the weighting factor comprises determining a set of cross-sensor linearized coefficients comprising the weighting factor for each channel pair, using an exhaustive searching loop through multi-iteration training.

8. The method of claim 1, further comprising selecting the master sensor and at least one of the plurality of node sensors from at least one of:
two sensors having a same design, two sensors having a same configuration, and two sensors from a fabrication batch;
different fabrication batches, and from two sensors having the same design and having the same configuration;
different fabrication batches having a different design, and with a same number of elements having a same denomination; or
different designs, from different configurations, and originating from different fabrication batches.

9. The method of claim 1, further comprising truncating a master data set to a same number of samples as the node data set, wherein each sample in the master data set comprises a measurement having a temperature setting and pressure setting similar to a temperature setting and a pressure setting of at least one measurement in the node data set.

10. The method of claim 1, wherein finding the linear correlation between the compensated master data and the node data set comprises applying a weighting factor to a difference between a synthetic node sensor response and a synthetic master sensor response for a reference fluid selected from the set of training fluids, and adding the weighted difference to a master sensor response measured from the reference fluid.

11. The method of claim 1, further comprising determining at least one of a master sensor response of the master sensor or a node sensor response of one of the plurality of node sensors in the synthetic parameter space with a dot product of a fluid spectral response vector and a convolved spectral response vector for one of the master sensor or the one of the plurality of node sensors.

12. The method of claim 1, wherein obtaining the plurality of node sensor responses with the plurality of node sensors in the set of training fluids comprises measured and simulated node sensor responses from reference fluids at broad ranges of temperature settings and pressure settings.

13. The method of claim 1, further comprising:
collecting optical responses from a plurality of petroleum fluids with known characteristics using the master sensor;
generating a plurality of synthetic node sensor responses associated with the plurality of petroleum fluids using the reverse transformation with cross-sensor linearized node sensor inputs in tool parameter space; and
calibrating a fluid characterization model using the plurality of synthetic node sensor responses.

14. The method of claim 1, further comprising:
introducing the calibrated tool into a wellbore drilled into one or more subterranean formations; and
measuring fluid properties of a well bore fluid in the well bore to obtain a fluid measurement.

15. The method of claim 14, wherein measuring the fluid properties of the wellbore fluid further comprises:
determining a fluid characteristic with synthetic fluid predictive models using reverse-transformed inputs from at least one node sensor response to the fluid measurement.

16. A method, comprising:
calibrating a tool comprising a master sensor and a node sensor, the calibrating comprising:
determining a value for a node sensor response of the node sensor in a synthetic parameter space using a two-dimensional temperature and pressure interpolation with given node sensor responses of the node sensor at specified temperatures and pressures,
determining a value for a master sensor response of the master sensor in the synthetic parameter space using the two-dimensional temperature and pressure interpolation with given master sensor response of the master sensor at specified temperatures and pressures,
determining a difference between the value for the node sensor response and the value for the master sensor response,
determining a set of cross-sensor linearized model coefficients based on the determined difference,
adjusting a master sensor channel selection from the master sensor to simulate a channel response of the node sensor,
obtaining a reverse transformation model using the simulated channel response of the node sensor and the set of cross-sensor linearized model coefficients, and
applying the reverse transformation model to node sensor responses, wherein said applying the reverse transformation model transforms each node sensor response from the tool parameter space to the synthetic parameter space.

17. The method of claim 16, further comprising:
obtaining a fluid measurement including determining a fluid characteristic with a synthetic fluid predictive model using reverse-transformed inputs from the node sensor response to the fluid measurement.

18. The method of claim 6, wherein determining the value for the node sensor response and determining the value for the master sensor response comprises varying temperature and pressure conditions for a plurality of node sensor responses and master sensor responses.

19. The method of claim 6, wherein adjusting the master sensor channel selection to simulate the channel response of the node sensor comprises:
identifying a set of cross-sensor linearized coefficients for a node sensor channel based on a plurality of training fluids; and
obtaining the channel response of the node sensor on a plurality of application fluids with the set of cross-sensor linearized model coefficients.

20. The method of claim 16, wherein obtaining the reverse transformation model using the simulated channel response of the node sensor comprises combining the node sensor response on a plurality of training fluids and a plurality of application fluids to develop the reverse transformation model with a neural network.

21. A method, comprising:
calibrating a tool comprising a master sensor and a plurality of node sensors, the calibrating comprising:
obtaining a plurality of master sensor responses from the master sensor for a set of training fluids,
obtaining a first plurality of node sensor responses from the plurality of node sensors for the set of training fluids, each of the plurality of node sensors and the master sensor including an optical element, determining a linear correlation between a compensated master sensor data set comprising a plurality of compensated master sensor responses for the set of training fluids and a node sensor data set comprising the first plurality of node sensor responses, generating a second plurality of node sensor responses in a tool parameter space from the compensated master data set for a set of application fluids, obtaining a reverse transformation model based on a third plurality of node sensor responses for a set of calibration fluids that comprises the set of training fluids and the set of application fluids; and applying the reverse transformation model to node sensor responses, wherein said applying the reverse transformation model transforms each node sensor response from the tool parameter space to a synthetic parameter space.

22. The method of claim 21, further comprising:
obtaining a fluid measurement including determining a fluid characteristic with synthetic fluid predictive models using reverse-transformed inputs from at least one of the node sensor responses to the fluid measurement.

23. The method of claim 21, wherein obtaining the plurality of node sensor responses from the plurality of node sensors for the set of training fluids comprises determining a temperature setting and a pressure setting of the set of training fluids according to a temperature setting and a pressure setting of the set of training fluids from which the plurality of master sensor responses are obtained.

24. The method of claim 21, wherein the calibrating further comprises:
selecting the master sensor and one of the plurality of node sensors from two sensors having at least one of different designs, different configurations, or different fabrication batches.

25. The method of claim 21, further comprising introducing the calibrated tool into a wellbore drilled into one or more subterranean formations to obtain a fluid measurement.

* * * * *

UNITED STATES PATENT AND TRADEMARK OFFICE
CERTIFICATE OF CORRECTION

PATENT NO. : 10,684,391 B2
APPLICATION NO. : 15/900679
DATED : June 16, 2020
INVENTOR(S) : Dingding Chen et al.

Page 1 of 1

It is certified that error appears in the above-identified patent and that said Letters Patent is hereby corrected as shown below:

In the Claims

Column 28, Line 41, please replace -6- with --16--.

Column 28, Line 46, please replace -6- with --16--.

Signed and Sealed this
Twenty-fifth Day of August, 2020

Andrei Iancu
*Director of the United States Patent and Trademark Office*